(12) United States Patent
Dierks

(10) Patent No.: US 9,721,290 B2
(45) Date of Patent: Aug. 1, 2017

(54) ON-LINE PAYMENT TRANSACTIONS

(71) Applicant: GOOGLE INC., Mountain View, CA (US)

(72) Inventor: Timothy M. Dierks, Brooklyn, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/076,777

(22) Filed: Nov. 11, 2013

(65) Prior Publication Data

US 2014/0074662 A1    Mar. 13, 2014

Related U.S. Application Data

(60) Continuation of application No. 13/568,253, filed on Aug. 7, 2012, now Pat. No. 8,583,501, which is a continuation of application No. 13/118,352, filed on May 27, 2011, now Pat. No. 8,266,001, which is a
(Continued)

(51) Int. Cl.
*G06Q 20/32* (2012.01)
*G06Q 30/06* (2012.01)
*G06Q 20/10* (2012.01)
*G06Q 20/12* (2012.01)

(52) U.S. Cl.
CPC ....... *G06Q 30/0635* (2013.01); *G06Q 20/102* (2013.01); *G06Q 20/12* (2013.01); *G06Q 30/06* (2013.01); *G06Q 30/0601* (2013.01); *G06Q 30/0609* (2013.01); *G06Q 30/0611* (2013.01); *G06Q 30/0613* (2013.01); *G06Q 30/0617* (2013.01); *G06Q 30/0633* (2013.01); *G06Q 30/0641* (2013.01)

(58) Field of Classification Search
CPC ...................................................... G06Q 30/06
USPC .................................................. 705/26.1, 44
See application file for complete search history.

(56) References Cited

U.S. PATENT DOCUMENTS 6,119,101 A * 9/2000 Peckover ..................... 705/7.31
6,331,858 B2   12/2001 Fisher
6,594,692 B1 * 7/2003 Reisman ....................... 709/219
(Continued)

FOREIGN PATENT DOCUMENTS

KR    10-2000-0036568       7/2000
KR    10-2000-0072125 A    12/2000
(Continued)

OTHER PUBLICATIONS

Walmart—Site to Store web search, http://web.archive.org/web/20101112113000/http://www.walmart., pp. 1, Nov. 12, 2010.
(Continued)

*Primary Examiner* — Lindsay M Maguire
(74) *Attorney, Agent, or Firm* — Johnson, Marcou & Isaacs, LLC

(57) ABSTRACT

A computer-implemented method includes generating on a user terminal a merchant web site associated with a merchant with code for a merchant web page, transmitting a product selection request for the user to a remote open payment system that is separate from the merchant, and displaying purchase information responsive to the product selection request using the code for the merchant web page.

20 Claims, 17 Drawing Sheets

Related U.S. Application Data division of application No. 12/021,888, filed on Jan. 29, 2008, now Pat. No. 7,953,642.

(60) Provisional application No. 60/887,108, filed on Jan. 29, 2007.

(56) References Cited

U.S. PATENT DOCUMENTS

| | | | |
|---|---|---|---|
| 6,980,962 B1* | 12/2005 | Arganbright et al. | 705/14.31 |
| 7,175,079 B1 | 2/2007 | Silverbrook et al. | |
| 7,197,475 B1 | 3/2007 | Lorenzen et al. | |
| 7,225,148 B2* | 5/2007 | Kassan | 705/26.44 |
| 7,596,513 B2 | 9/2009 | Fargo | |
| 7,890,634 B2 | 2/2011 | Jiang et al. | |
| 7,895,570 B2 | 2/2011 | Gibson et al. | |
| 7,953,642 B2 | 5/2011 | Dierks | |
| 7,975,020 B1 | 7/2011 | Green et al. | |
| 8,117,089 B2 | 2/2012 | Minsky et al. | |
| 8,266,001 B2 | 9/2012 | Dierks | |
| 8,583,501 B2 | 11/2013 | Dierks | |
| 2001/0019332 A1* | 9/2001 | Fisher | 345/582 |
| 2002/0006126 A1 | 1/2002 | Johnson et al. | |
| 2002/0007321 A1* | 1/2002 | Burton | 705/26 |
| 2002/0049637 A1 | 4/2002 | Harman et al. | |
| 2002/0055878 A1* | 5/2002 | Burton et al. | 705/26 |
| 2003/0014319 A1 | 1/2003 | Arbab et al. | |
| 2004/0051727 A1 | 3/2004 | Endo et al. | |
| 2005/0027610 A1 | 2/2005 | Wharton | |
| 2005/0097005 A1 | 5/2005 | Fargo | |
| 2006/0047582 A1 | 3/2006 | Jiang | |
| 2006/0173754 A1* | 8/2006 | Burton et al. | 705/27 |
| 2006/0293926 A1 | 12/2006 | Khury | |
| 2006/0293965 A1* | 12/2006 | Burton | 705/26 |
| 2007/0022020 A1 | 1/2007 | Bernstein | |
| 2008/0183593 A1* | 7/2008 | Dierks | 705/26 |
| 2008/0307299 A1 | 12/2008 | Marchant et al. | |
| 2009/0077091 A1 | 3/2009 | Khen et al. | |
| 2009/0254450 A1 | 10/2009 | Bollay | |

FOREIGN PATENT DOCUMENTS

| | | |
|---|---|---|
| KR | 10 2002 0024356 A | 3/2002 |
| WO | WO 00/57332 A2 | 9/2000 |
| WO | WO 01/01313 A2 | 1/2001 |
| WO | 2008/115620 A2 | 9/2008 |
| WO | 2008/115620 A3 | 2/2009 |

OTHER PUBLICATIONS

Release Notes for Google Checkout XML API Developers Guide, Internet webpage: https://developers.google.com/checkout/developer/release_notes, pp. 1-25, Jun. 23, 2010.

Beal, Vangie, Google Checkout Open, Ready for Business, ECommerce Guide: http://ecommerce-guide.com/news/article.php/3617211/Google-, pp. 1, Jun. 28, 2006.

Chismar, T., The Home Depot Unveils App Versions—iPhone 3.2 & Android 3.1, http://ext.homedepot.com/community/blog/the-home-depot-unveils-new-app-versions-iphone-3, pp. 1-3, Feb. 6, 2012.

Derry, P., European Office Action issued in Application No. 08799600.5, pp. 1-9, Dec. 16, 2013.

Derry, P., Supplemental EPO Search Report issued in Application No. 08799600.5, pp. 1-3, Oct. 4, 2013.

Maguire, L., Office Action issued in copending U.S. Appl. No. 13/118,352, filed May 27, 2011, pp. 1-7, Oct. 24, 2011.

Maguire, L., Office Action issued in copending U.S. Appl. No. 12/021,888, filed Jan. 29, 2008, pp. 1-11, May 26, 2010.

Maguire, L. M., Office Action issued in copending U.S. Appl. No. 13/568,253, filed Aug. 7, 2012, pp. 1-9, Feb. 20, 2013.

Miller, M., Choosing an Online Payment Service: Google Checkout vs. PayPal (extract from interne—Google Books), pp. 1-10, Sep. 1, 2006.

Ryan, D., Home Depot Offers Buy Online, Pick Up or Return In-Store Service—Home Improvement Blog—The Apron by the Home Depot, http://ext.homedepot.com/community/blog/home-depot-now-offers-, pp. 1-14, Aug. 31, 2011.

Son, H., International Preliminary Report on Patentability—PCT/US2008/052327, pp. 1-6, Dec. 30, 2008.

Giffo-Schmitt, "International Preliminary Report on Patentability issued in International Application No. PCT/US2008/052327", mailed on Aug. 4, 2009, 6 pages.

Guerra, "Office Action received for Canada Patent Application No. 2676959", mailed on Aug. 21, 2013, 3 pages.

* cited by examiner

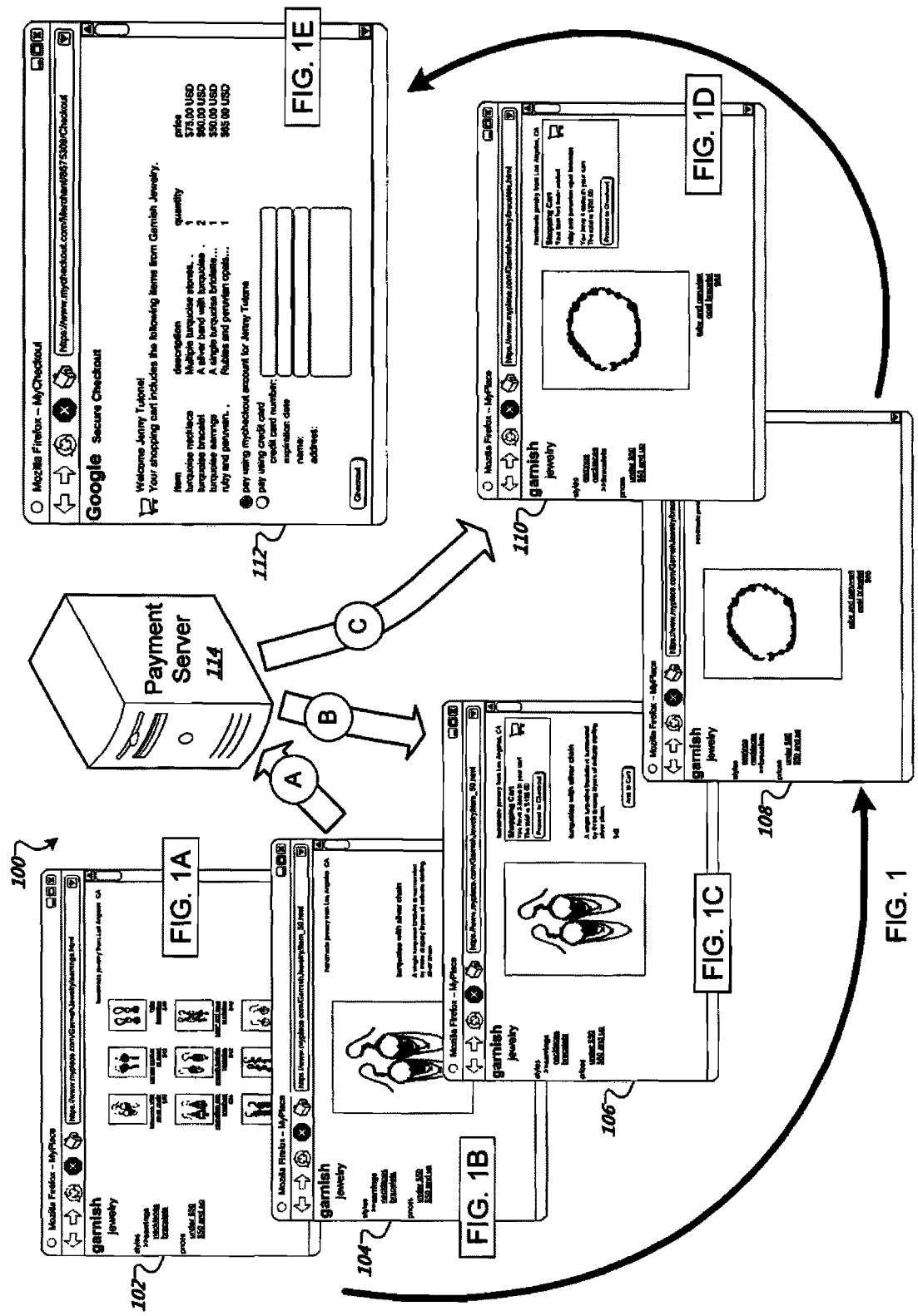

ON-LINE PAYMENT TRANSACTIONS

CROSS-REFERENCE TO RELATED APPLICATIONS

This patent application is a continuation application of and claims priority to U.S. patent application Ser. No. 13/568,253, filed Aug. 7, 2012 and entitled "On-Line Payment Transactions," which is a continuation application of and claims priority to U.S. patent application Ser. No. 13/118,352, now U.S. Pat. No. 8,266,001, filed May 27, 2011 and entitled, "On-Line Payment Transactions," which is a divisional application of and claims priority to U.S. patent application Ser. No. 12/021,888 now U.S. Pat. No. 7,953,642 filed Jan. 29, 2008 and entitled "On-Line Payment Transactions," which claims priority to U.S. Patent Application No. 60/887,108, filed on Jan. 29, 2007, and entitled "On-Line Payment Transactions." The entire contents of the above-identified priority applications are hereby fully incorporated by reference.

TECHNICAL FIELD

This document discusses systems and methods for providing interaction with users of an on-line payment system.

BACKGROUND

Every year, sales at on-line retailers surpass the totals of the year before. Computer users have become more and more comfortable reviewing products on the internet and having them delivered via mail order. Often, such purchases are paid for using credit cards. Such an approach may be convenient, such as when buying a large item from an established retailer. Other transactions lend themselves more toward on-line payment processing systems (which themselves may obtain information through credit card companies or by other mechanisms). For example, person-to-person transactions may be paid for through open payment systems such as GOOGLE CHECKOUT or PAYPAL, such as when the person providing the product or service (the merchant or vendor) does not accept credit cards. Other types of purchases may also be carried out using such payment systems.

Small vendors, such as individuals, may have a need for such payment systems, such as when they cannot afford processing fees associated with other payment systems, cannot accept the risk of certain payment systems, or do not want to undertake complicated registration processes for other payment systems. For example, a seller of movie memorabilia may register with one of the on-line payment processing systems and may have others send them money for each sale. Such a user may also develop a web page that permits users to click on items to select, and that carries out an ordering and payment process for such users.

However, such an approach is often much less fulfilling for the user and the vendor than is a similar system offered by a major on-line store. For example, purchases from an integrated on-line store may appear seamless to the user, with a common user interface throughout the shopping and purchasing processes. In contrast, use of a general payment system (i.e., a system that is open to various vendors who register with the system, such as by providing an account identifier for the deposit of finds from making sales) may not be so smooth. For example, when a user selects an item, they may be directed away from the vendor's web page and to a web page associated with the payment system—a page that may be very different from the vendor's page, which will cause disruption to the user's actions, with a transition that looks less-than-professional. In addition, a vendor may have to spend extensive time coding a page with all sorts of special controls, and may even have to hire a programmer to develop the page in order to interact with such a payment system.

SUMMARY

This document describes systems and methods that may be employed to provide shoppers with mechanisms for tracking items they would like to purchase, and for which they need to pay. The techniques described here may permit relatively unsophisticated web page developers to integrate their web pages with an on-line payment system. For example, computer code may be generated for a vendor by a central system, where the code in turn generates a control on the vendor's web page that shoppers may select to have a purchase transaction executed by a payment system associated with the central system. As one example, an item listed on the vendor's page may be placed in a shopper's shopping cart with a system such as GOOGLE CHECKOUT. The occurrence of the transaction may also be reflected on the shopper's display without a need to redirect the shopper to a separate page associated with the central system.

Such techniques may, in certain implementations, provide one or more advantages. For example, they may permit a more seamless and professional shopping experience for shoppers by placing shopping cart information on or over the pages of vendors. Such an approach may look more like familiar shopping processes from integrated retailers, than it does like a pieced-together system. Such an approach may also allow for seamless operation from relatively unsophisticated vendors, thereby enabling many more small companies and individuals to provide rich shopping experiences. In addition, the techniques benefit shoppers because the shoppers can be provided better options for buying goods and services, including through a single point of payment that increases simplicity and security.

In one implementation, a computer-implemented method is disclosed. The method includes generating, on a user terminal, a merchant web site associated with a merchant with code for a merchant web page, transmitting a product selection request for the user to a remote open payment system that is separate from the merchant, and displaying purchase information responsive to the product selection request using the code for the merchant web page. The purchase information can include quantity and price information for items selected for purchase by a user of the user terminal. Also, the code for the merchant web page can include buy button code generated by a service associated with the remote open payment system. The product selection request can include a merchant identifier and a customer identifier, and the customer identifier can include an anonymous identifier. In addition, the method may also include associating the anonymous identifier with a user ID when the user logs into the open payment system on the user terminal.

In certain aspects, the method may further include receiving from the remote open payment system information associated with a shopping cart. Transmitting the product selection request and receiving information associated with a shopping cart can, in such circumstances, comprise asynchronous Javascript and XML messaging. In addition, displaying the purchase information can comprise displaying shopping cart information in a common content area with the merchant web site, and the shopping cart information can be displayed in a floating pane over the merchant web site. In some implementations. displaying the shopping cart information includes displaying a shopping cart total that includes shipping and tax charges. Also, displaying the purchase information can include displaying an iframe in a common content area with the merchant web site.

In other aspects, the method may further comprise hiding the purchase information until other purchase information is received from the open payment system. In addition, the product selection request can be associated with a sunset period during which a selected product to be purchased will be available at a quoted price. In other implementations, the purchase information request includes a check value for verifying that code for the merchant web page associated with the purchase information request has not been tampered with. In certain situations, the merchant does not obtain private payment information for the user. Also, the product selection request can be generated by a client-side scripting reference, and the purchase information can be displayed without a browser refresh. The method may also include receiving a transaction closing selection on the user terminal and redirecting the user terminal to a web page generated by the open payment system. Such a web page generated by the open payment system can include shipping and tax information computed by the open payment system.

In another implementation, a computer-implemented method is disclosed. The method includes receiving at an open payment system a request from a remote device to select an item for purchase on a third-party vendor page, associating the received request with a vendor of the item, and transmitting to the remote device, in response to the request, data for displaying selected item information to a user of the remote device on the third-party merchant page without a browser window refresh. The received request can include a vendor identifier and a user identifier, and the user identifier can include data from a cookie. The method may further include associating a purchase transaction relating to the received request with the cookie, and also receiving a log in from a user of the remote device and associating a user ID for the user with the purchase transaction. Moreover, the received request can be generated by the selection of a product selection control on the merchant page, and the method may also include receiving parameters for an item to be offered for sale on the merchant page, and providing mark-up code for incorporation in the merchant page for generating the product selection control.

In some aspects, the method further includes receiving a second request to select a second item for purchase, associating the received request with a vendor of the second item, and transmitting to the remote device data for displaying information relating to the selected item and the second selected item. Also, the selected item of the method can be associated with a different vendor than the second selected item. Also, the method may additional include receiving at the open payment system a checkout request, and generating in response, data for displaying a group of items previously selected for purchase on the remote device. The method may also include receiving a checkout confirmation request and modifying accounts associated with the vendor and the remote device to reflect purchases submitted by a user of the remote device on the web page.

In yet another implementations, a payment system is disclosed. The system includes a web browser configured to display mark-up code, and memory storing mark-up code including code for generating a merchant web page, code for generating on the merchant web page a buy control associated with an open payment system, and code for causing, in a common content area with the merchant web page, a display of shopping cart information for a visitor to the merchant web site. The display of shopping cart information is coded to appear in an iframe in some implementations, and the system may further include code for receiving from a remote server and asynchronously updating data relating to items associated with the buy control. In addition, the code for causing a display of shopping cart information can include code pointing to Javascript code.

In another implementation, a payment system is disclosed and comprises an interface to receive requests generated by selection of purchasing controls in remotely operated web pages, a database storing information about pending shopping carts associated with user accounts, and a transaction module configured to receive purchase requests generated by remote selection of purchase controls and to transmit information reflecting information about a pending shopping cart in a format for display in a common display area with one of the remotely operated web pages. The transaction module is, in some examples, further configured to change an inventory amount for a vendor associated with the one of the remotely operated web pages. In addition, the system can further comprise a transaction processor to compare the received requests to a security code to verify that the supplied parameters have not been tampered with, and the transaction module can be further configured to effect changes in account balances for a vendor associated with, and a shopper using, the one of the remotely operated web pages.

In some aspects, the system also includes an HTML generator configured to receive parameters relating to an item offered for sale and to generate HTML code pointing to an open payment system for submitting information about the item offered for sale to the open payment system. The HTML generator may provide one or more forms for entry of parameters and receive the parameters associated with the provided forms. In addition, the HTML generator can combine the received parameters with one or more HTML templates associated with the one or more forms.

In yet another implementation, a payment system is disclosed. The system comprises an interface to receive requests generated by selection of purchasing controls in remotely operated web page, a database storing information about pending shopping carts associated with user accounts, and means for generating web browser displayable content for a shopping cart in response to receipt of a purchase command from selection of a purchasing control.

In another implementation, a computer-implemented method includes receiving a request from a client device over a network, and serving to the client device a merchant webpage that includes code for producing a display of products selected for purchase by a user of the client device in a common content area with the merchant web page. The merchant web page may further include a selectable control that causes a request to be sent to an open payment system to add an item from the merchant web page to a pending list of items for a visitor to the merchant web page. In addition, the method may further include submitting parameters to the open payment system relating to an item for sale, and receiving in return code for generating the selectable control.

The details of one or more embodiments are set forth in the accompanying drawings and the description below.

Other features, objects, and advantages will be apparent from the description and drawings, and from the claims.

DESCRIPTION OF DRAWINGS

FIG. 1 shows a graphical conceptual flow diagram of a process for obtaining payment for a purchased item.

Like reference symbols in the various drawings indicate like elements.

DETAILED DESCRIPTION

Figure 1A:
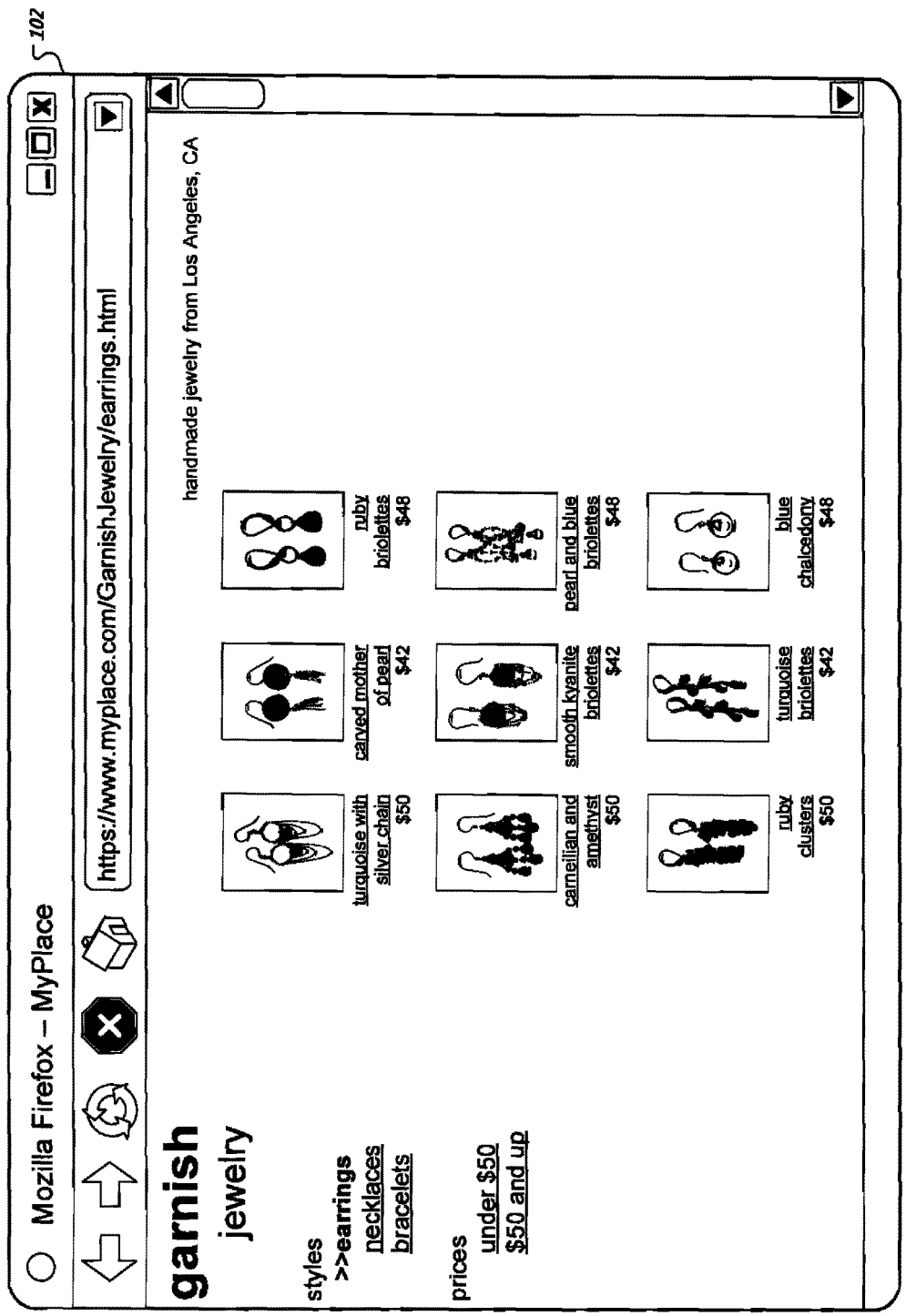
FIGS. 1A-1E show example screen shots associated with the conceptual flow diagram of FIG. 1.
Figure 1B:
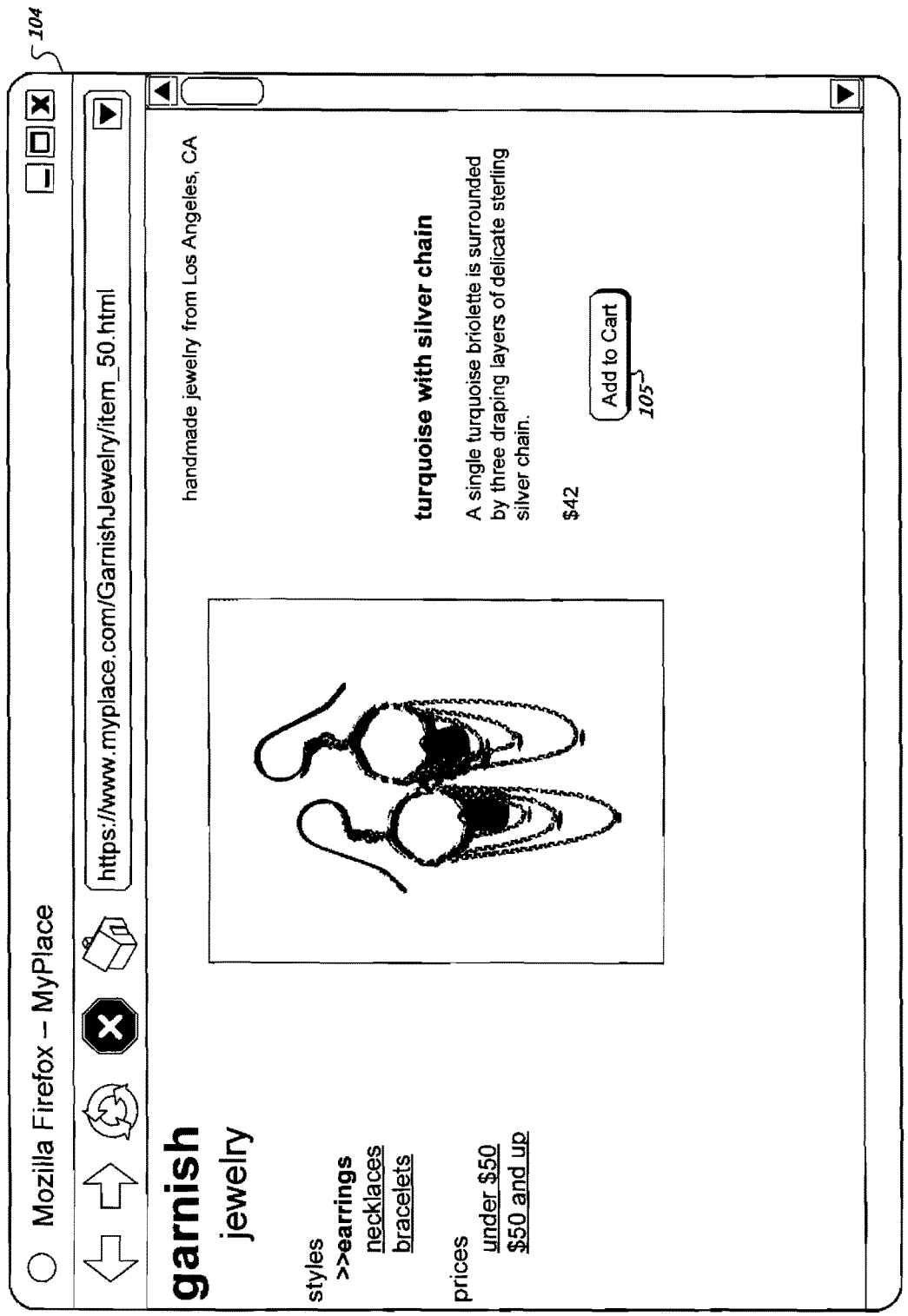

FIG. 1 shows a graphical conceptual flow diagram of a process for obtaining payment for a purchased item. FIGS. 1A-1E show example screen shots associated with the conceptual flow diagram of FIG. 1. The process shows an example for user interaction with an on-line payment system, such as GOOGLE CHECKOUT, involving purchasing a piece of jewelry from a web site operated by a small-scale jewelry maker—such as an individual who has a day job but makes and sells jewelry on the side. In general, the process and the screen shots illustrate the steps a purchaser would take, and the screens the purchaser would see, when buying several pieces of jewelry. Of particular interest, the various components of an on-line payment system are visually integrated with the vendor's own web site so that the purchaser can see the progress of their shopping as they go along, much as they would in an integrated purchasing environment, where the vendor itself takes care of payment processing.

By this example process, the system may, in appropriate circumstances, be able to avoid taking a purchaser on a "round trip" to the payment processor's web page and back to the vendor's page, or opening another window or tab in a browser in many situations. In general, such a new window would likely have a different interface than does the web site of the vendor, and could thus be confusing to the purchaser, or at least take away from the immersive aspect of the shopping transaction that is more readily available when one company handles both the merchandise and payment processing.

Display 102 shows a general page from a vendor's web site. The display 102, for a vendor called Garnish Jewelry, shows a number of high-quality, handcrafted jewelry pieces (see FIG. 1A). In the example, the vendor is an individual who works full-time at another job and is very intelligent but has limited computer skills. She enjoys crafting jewelry and sharing her work with others, but she does not have the time to learn how to set up a full-blown e-commerce site, and she certainly does not have the money to do so. At the same time, she wishes, as much as possible, to give shoppers on her site the feel that they are using a full-blown e-commerce site.

Display 104 shows a screen from the purchaser selecting one of the pieces of jewelry—a pair or earrings with silver chains—from display 102. General web page content is shown in the display 104, with navigational menu controls in the form of selectable hyperlinks to the left, an image of the product for sale, a description of the product, and a price for the product (see FIG. 1B). In addition, display 104 shows a selectable control in the form of an "add to cart" button 105 that a purchaser may select to purchase a unit of the product—here a pair of earrings.

As explained in more detail below, the button 105 is generated using JavaScript (or, e.g., Jscript or VBScript) associated with the vendor's underlying web page that generates display 104. That Javascript code may be generated by the vendor or an agent of the vendor, or may be obtained from a payment processor such as the GOOGLE CHECKOUT service. The JavaScript may be stored by the payment processor and referenced by code on the vendor web site, such as the following example code:

```
<script
    type="text/javascript"
    src="https://www.mycheckout.com/shoppingcart.js?sellerId=
    8675309">
</script>
<span id="mycheckout_status_bar"></span>
<script type="text/javascript"
    src="https://www.cmyheckout.com/shoppingcart.js?sellerId=
    8675309">
</script>
<span id="mycheckout_status_bar"></span>
```

Selection of the button 105 may cause an HTTP request, in the form of an XMLHttpRequest (XHR), to be made of payment server 114, as indicated by Arrow A. In the example, selection of the button 105 may affect the following example mark-up code:

```
<form
action="https://checkout.google.com/cws/v2/Merchant/407222244214841/
add" onsubmit="return false;" method="post">
<input type="hidden" name="item"
value="PD94bWwgdmVyc2lvbj0iMS4wliBlbmNvZGluZz0iVVRGLTg
iPz4NCjxJdGVtlHhtbG5zPSJodHRwOi8vY2hlY2tvdXQuZ29vZ2xlL
mNvbS9zY2hlbWEvMil+DQoglDxxdWFudGl0eT4xPC9xdWFudGl0
eT4NCiAgPHVuaXQtcHJpY2UgY3VycmVuY3k9llVTRCI+NTAuMD
wvdW5pdC1wcmljZT4NCiAgPGl0ZW0tbmFtZT50dXJkW9pc2Ugd
2l0aCBzaWx2ZXIgY2hhaW48L2l0ZW0tbmFtZT4NCiAgPGl0W0tZ
GVzY3JpcHRpb24+QSBzaW5nbGUgdHVycXVvaXNllGJyaW9sZX
R0ZSBpcyBzdXJyb3VuZGVklGJ5lHRocmVllGRyYXBpbmcgbGF5
ZXJzlG9mlGRlbGljYXRllHN0ZXJsaW5nlHNpbHZlciBjaGFpbi48L2l
0ZW0tZGVzY3JpcHRpb24+DQo8L0l0ZW0+">
<input type="hidden" name="signature"
value="vR5n4aMp9bDbplklbCfaBVdo98c=">
<input src="https://checkout.google.com/img/addtoCart.gif"
alt="Add to Cart" type="image" onclick="PCWL_swapImage(this,
"https://checkout.google.com/img/addedtoCart.gif");">
</form>
</td>
```

A hash code can be passed from the selection on the vendor's page to the payment server 114. This hash code may have been generated when the underlying mark-up code for the "add to cart" button 105 was generated, and may represent a hash function applied to that mark-up code. For example, as described in more detail below, a service associated with the payment server 114 may generate both the mark-up code and a corresponding hash code. The hash code may then be checked by the payment server 114 in a conventional manner to ensure that the mark-up code has not been changed since it was provided by the system, such as by a purchaser attempting to lower the price for a good so that they can avoid paying full price. Sensitive information may also be verified by techniques such as storing prices (or ranges of permissible prices) at the payment server 114, and using those prices for a transaction or as a check on a transaction.

The payment server 114 may then parse the HTTP request to obtain an identifier for the purchaser, and also to identify the vendor and relevant payment parameters. The identity of the purchaser may be determined, in one implementation, from a session ID. The purchaser may be positively identified, for example, if the purchaser has previously logged into a system associated with the payment sever 114 (such as through a general GOOGLE log in) or using a cookie. The purchaser may also be identified by their device without immediate identification of the purchaser, such as by a session ID that can later be associated with a user ID in the system when the purchaser logs in to the payment processing system.

In addition, where the vendor stores information relating to the vendor's inventory using a system associated with payment server 114, such as GOOGLE BASE, the payment server 114 can also check such a database for availability of the selected goods. The payment server 114 may also place a "hold" flag on the goods in the inventory database, or conduct others steps, so that another purchaser does not buy the last of the inventory while the first purchaser is finishing his or her shopping.

When the purchaser and vendor have been identified and the balance of the purchaser's shopping cart incremented, the changes may be passed back to the client device of the purchaser, as shown by Arrow B. The transmission of information may occur, for example, by XML transmission formatted in a manner compatible with the code running on the client device. As one example, the payment server may pass information reflecting a description of the selected item(s), their quantity, their price, and a total price of goods in the purchaser's shopping cart.

Figure 1C:
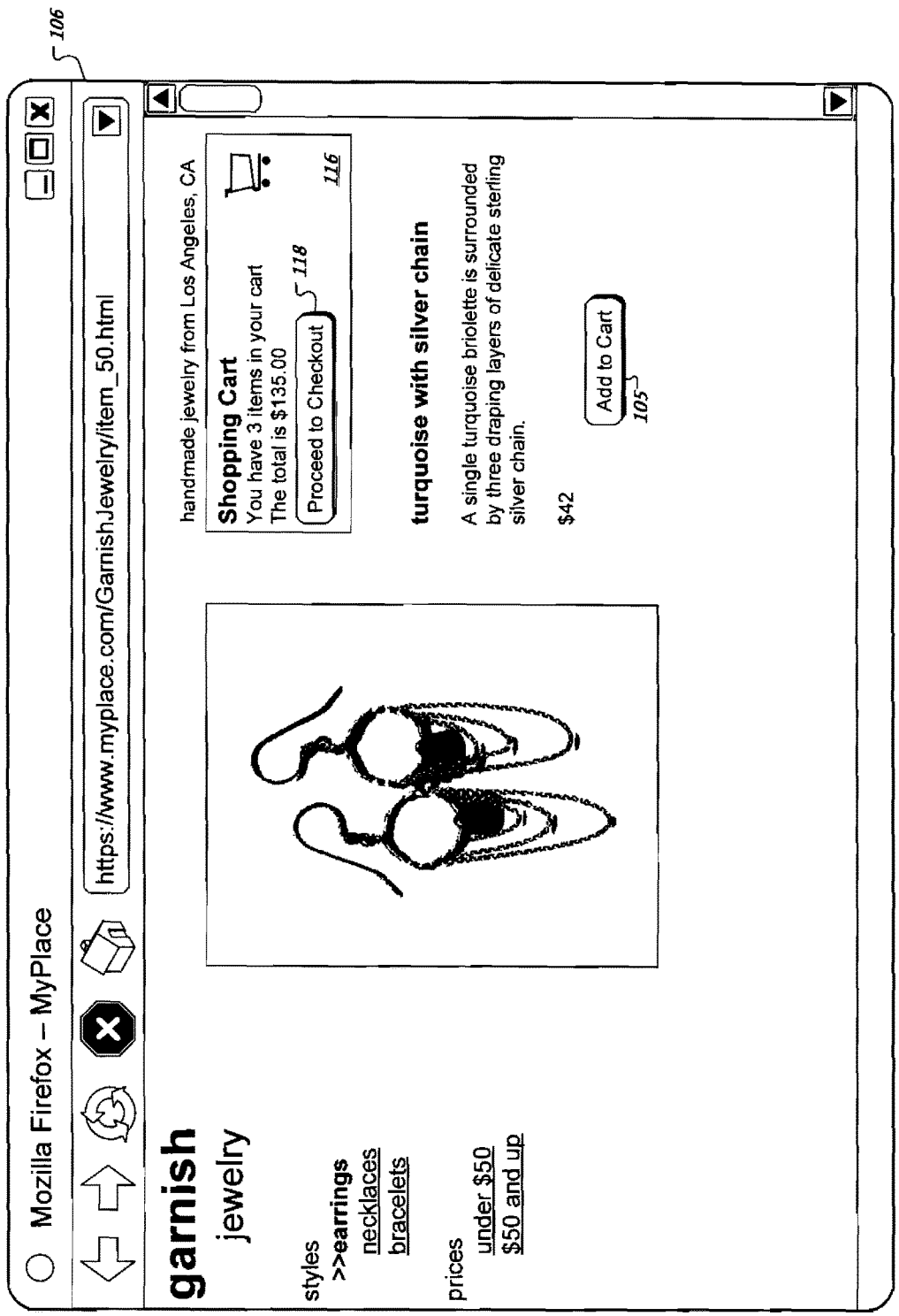

Display 106 shows the result of a user's selection of button 105 (see FIG. 1C). Specifically, a shopping cart object shown as a graphical element such as an iframe 116 has been created on display 106. The iframe 116 is generated using the information received from the payment server 114. Such generation of the iframe 116 may occur asynchronously with the receipt of information from payment server 114. Example code for generating the window for the iframe may take the form of:

```
<html> <head> <link media="screen"
href="https://checkout.google.com/files/popupwidget.css"
type="text/css" rel="stylesheet"> <script type="text/javascript"><!--
    function PCPW__getObj(doc,name) {
      if (doc.getElementById) {
        return doc.getElementById(name);
      } else if (doc.all) {
```
```
        return doc.all[name];
      } else if (doc.layers) {
        return doc.layers[name];
      }
    }
    function PCPW__updateStatusBar( ) {
      var d;
      if (window.parent.gcheckout__cart) {
        d = window.parent.gcheckout__cart.document;
      } else {
        d = window.parent.frames['gcheckout__cart'].document;
      }
      PCPW__getObj(d, "items__in__cart").innerHTML = '1 item in cart'
      PCPW__getObj(d, "total__price2").innerHTML = " ($50.00)";
    }
    PCPW__updateStatusBar( );
//--> </script> </head>
<body style="background-color:transparent;">
  <div id="widget__open">
    <table cellpadding="0" cellspacing="0" class="tbord">
    <tr> <td colspan="2" id="update">
      <table cellpadding="0" cellspacing="0">
        <tr>
          <td>
            <div id="update__bg"> Your item has been added. </div>
          </td>
          <td id="close__token"> </td>
        </tr>
      </table>
    </td> </tr>
    <tr> <td colspan="2" id="item__details">
      <table cellpadding="0" cellspacing="0">
        <tr> <td colspan="2" id="item__name"> turquoise with
          silver chain </td> </tr>
        <tr> <td colspan="2" id="item__desc">A single
          turquoise briolette is surro... </td> </tr>
          <tr class="pb">
            <td width="25%;"> Qty: 1 </td>
            <td id="item__price"> $50.00 </td>
          </tr>
      </table> </td> </tr>
      <tr> <td class="pl">Items: <span id="num__items2"> 1
        </span></td>
            <td class="pr">Subtotal: <span id="total__price1">
              $50.00 </span></td> </tr> <tr> <td class="pl"> </td>
      <td> <form
action="https://checkout.google.com/cws/v2/Merchant/
407222244214841/checkoutPending" method="POST"
target="__top">
        <input src="https://checkout.google.com/img/gcb2.gif"
          alt="checkout" type="image" id="gcb__img"
          onclick="this.form.submit( );">
      </form> </td> </tr> </table> </div> </body> </html>
```

Various options are available to a purchaser viewing display 106. For example, the purchaser may select another pair of earrings by selecting the "add to cart" button 105 again. Such an action will repeat the transmission of an XMLHttpRequest command to the payment server 114, with the payment server 114 subsequently adding the total for another pair of earrings to the purchaser's shopping cart total, and returning XML or other data to cause the code operating on the purchaser's client to update the shopping cart iframe 116. The purchaser may also choose to go to a checkout to pay or otherwise edit entries in their shopping cart, by selecting the "proceed to checkout" control button 116. Such a selection may finally take the purchaser away from the vendor's underlying page, and to the payment processor's page (although the checkout may also be performed in the same content window of a browser as the vendor's web site, by mechanisms similar to those described above). This option is described in more detail with respect to FIG. 1E.

At display 108 and display 110 (FIG. 1D), the purchaser navigates to another page on the vendor's web site to look at more jewelry. Although display 108 does not show a shopping cart iframe, the shopping cart object may also be programmed to persist as the user navigates to more purchases. In this example, the absence of visibility of the shopping cart iframe permits a purchaser to more readily see content that may appear on the vendor's site. The purchaser may bring the iframe back whenever he or she selects additional items to add to his or her cart. The iframe may then be set to disappear after the user navigates to another page or after a set period of time has elapsed without the user selecting the iframe 116. Alternatively, the iframe 116 may be reduced in size, such as to a title bar or a small icon, that the user may select to cause the iframe 116 to expand to full size.

The iframe 116 may also persist in the display area of the vendor's page and disappear after a period of time (but remain persistent), and reappear later, such as only after it has been updated with new information. Such an action may prevent a user from seeing changes taking place in the window when they are made, so as to make the operation appear more seamless to the user.

Figure 1D:
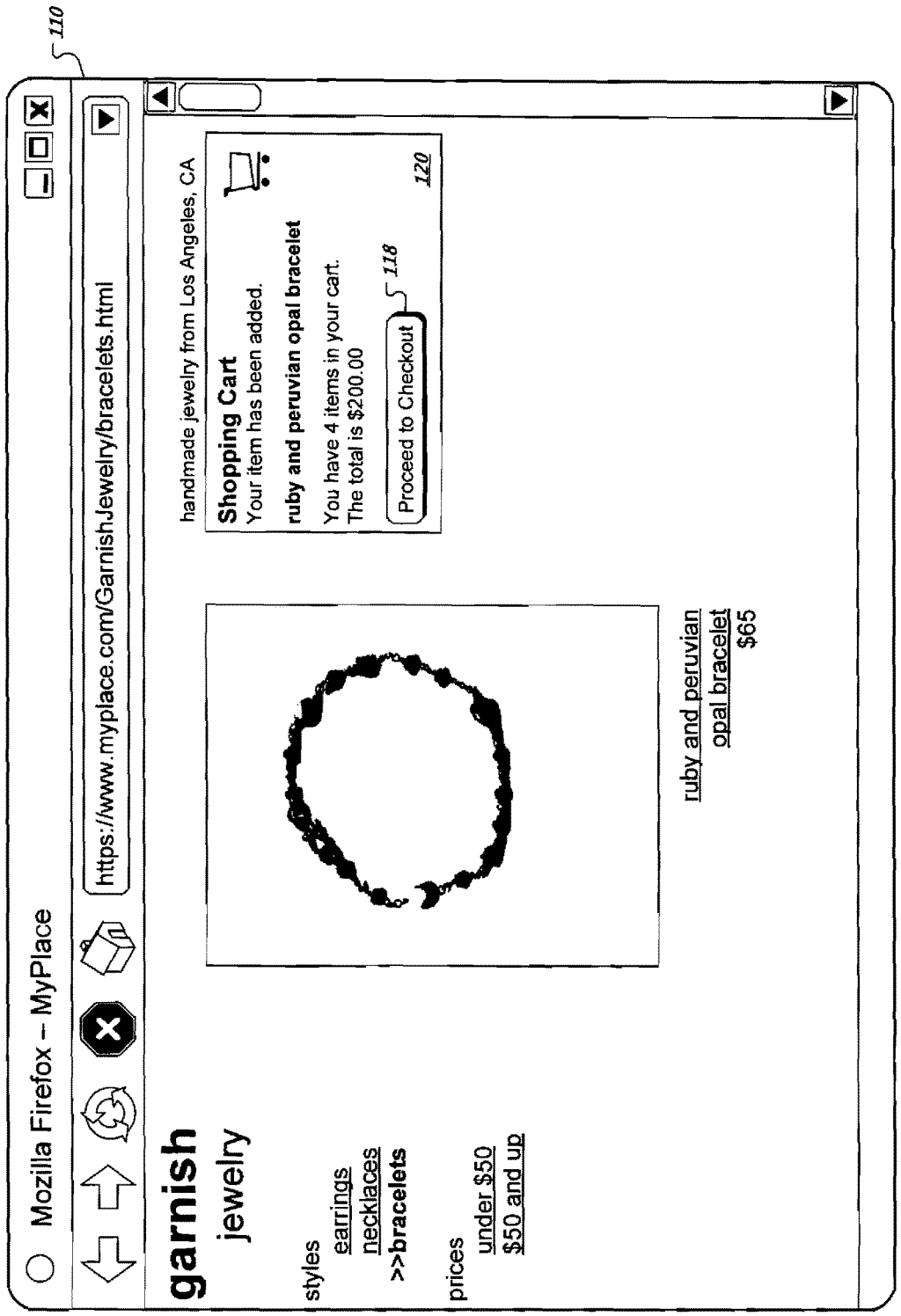
Figure 1E:
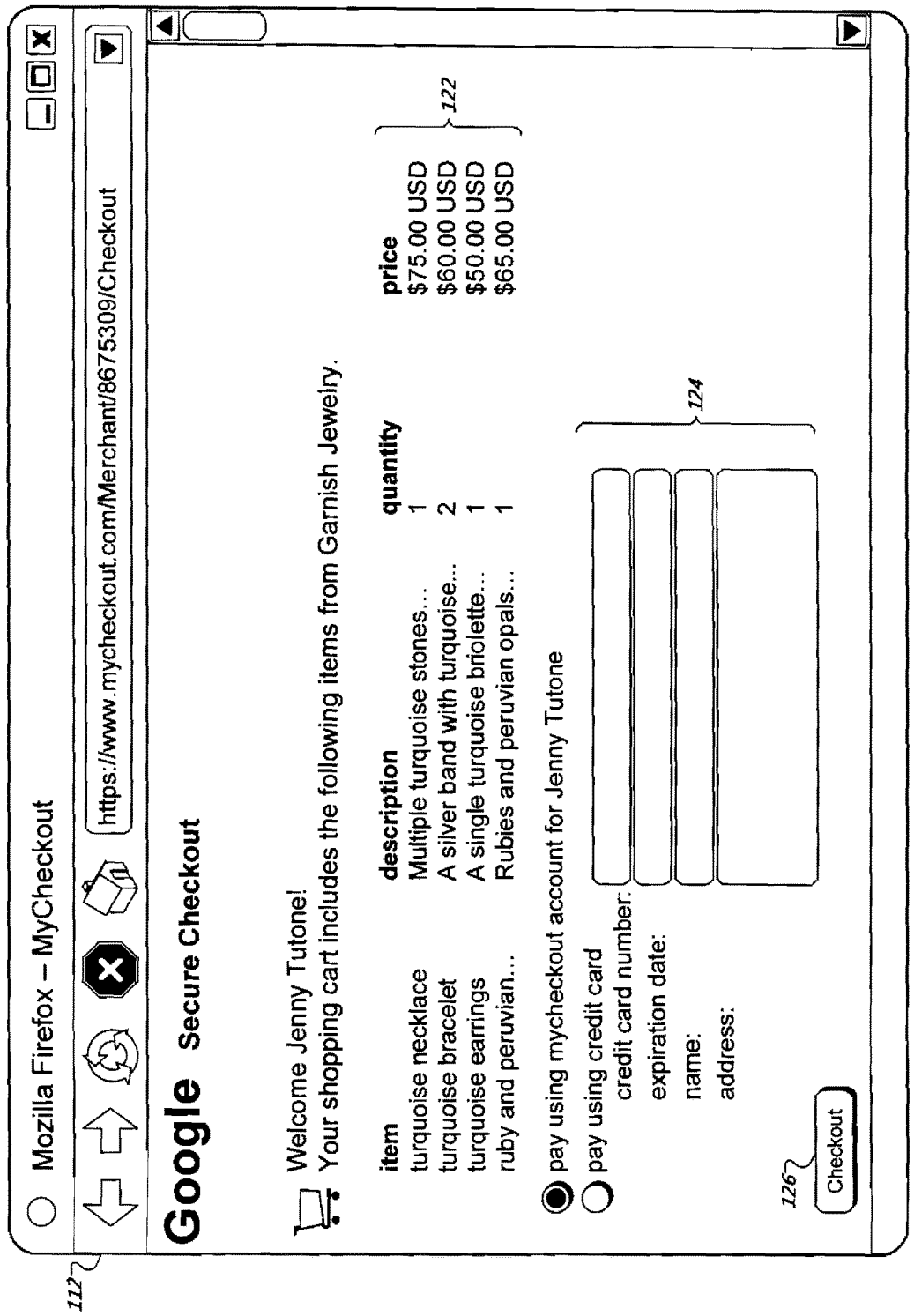

As shown in display 110, the iframe 116 has been updated to be shown as iframe 120 (see FIG. 1D). While the shopping cart was shown in iframe 116 to contain 3 items for $135, it now contains 4 items for $200 in iframe 120, indicating that the purchaser selected the ruby and Peruvian opal bracelet for purchase. In doing so, the purchaser caused an HTTP request in the form of an XMLHttpRequest to be sent to the payment server 114, which then added the bracelet to the purchaser's shopping cart. The payment server 114 then returned information, such as in XML format, which was received by the purchaser's client device and caused to be displayed as part of the shopping cart iframe 120 on display 110, as indicated by Arrow C. Further selections by the purchaser of other items will cause similar actions, with the result being added items in the purchaser's pending shopping cart.

At display 112, the user/purchaser has selected a "proceed to checkout" button, and is redirected to a web page operated by the payment server 114. To generate this page, the payment server 114 may check its database fields that have been updated through the purchaser's selection of "add to cart" buttons. At this point, the interaction with the user may occur according to conventional mechanisms to permit closing out of the transaction. For example, the user may be shown a list of items and their prices 122 that have been selected by the user. The user may then select items to delete or may increase or otherwise change the quantities of items. Such changes will be reflected in associated databases managed by the payment processor. The user may also be permitted to select a payment method, such as through a GOOGLE CHECKOUT account or a debit or credit card or other payment mechanism 124. The payment server 114 may also store a preferred payment method for the user and use that method (or present it as a default) if the user does not select another. Finally, the user may confirm that the displayed information is accurate and may cause a closing of the transaction by selecting checkout button 120.

The payment server 114 may also prepare the order for immediate payment and closing if the identity of the user is known. If such identity is not known, the server 114 may provide an opportunity for the user to log in or otherwise authenticate and identify themselves. When such authentication takes place, a shopping cart that was previously associated with a session ID or similar identifier may be associated with the user ID of the authenticated user.

The payment server 114 may also compute parameters such as tax and shipping/handling. To do the former, the payment server 114 may analyze information about the purchaser and about the vendor (e.g., whether the two are in the same state or not, or whether the purchaser's shipping address is in a state having an applicable sales tax). For the latter, the payment server 114 may obtain information from the vendor about costs for shipping and handling; in certain implementations, the vendor may point the payment server 114 to a standard shipping table such as that maintained by public shipping companies like UPS or FEDERAL EXPRESS.

When the purchaser chooses to complete the purchase, their account is debited by the payment server 114 in an amount equal to the price of all the goods in the shopping cart plus tax, shipping/handling, and other costs, such as a transaction charge for the payment processor. In a like manner, an account for the vendor may be credited, and the creditor may be notified of the transaction, with shipping information for the purchaser. The vendor may have previously selected a preferred method for being informed of transactions, such as by e-mail for a small vendor and via XML messaging or updating of a database that is accessible to the vendor (e.g., as stored in GOOGLE BASE). In addition, the vendor and purchaser, in registering with the system, may have agreed to be contractually bound to make agreed-upon payments and/or deliveries of goods, so as to help ensure that transactions will be carried out successfully. The vendor may receive information such as the identity and quantity of goods sold, the amount of the transaction, and a shipping address for the purchaser so that the vendor can ship the goods.

Figure 2:
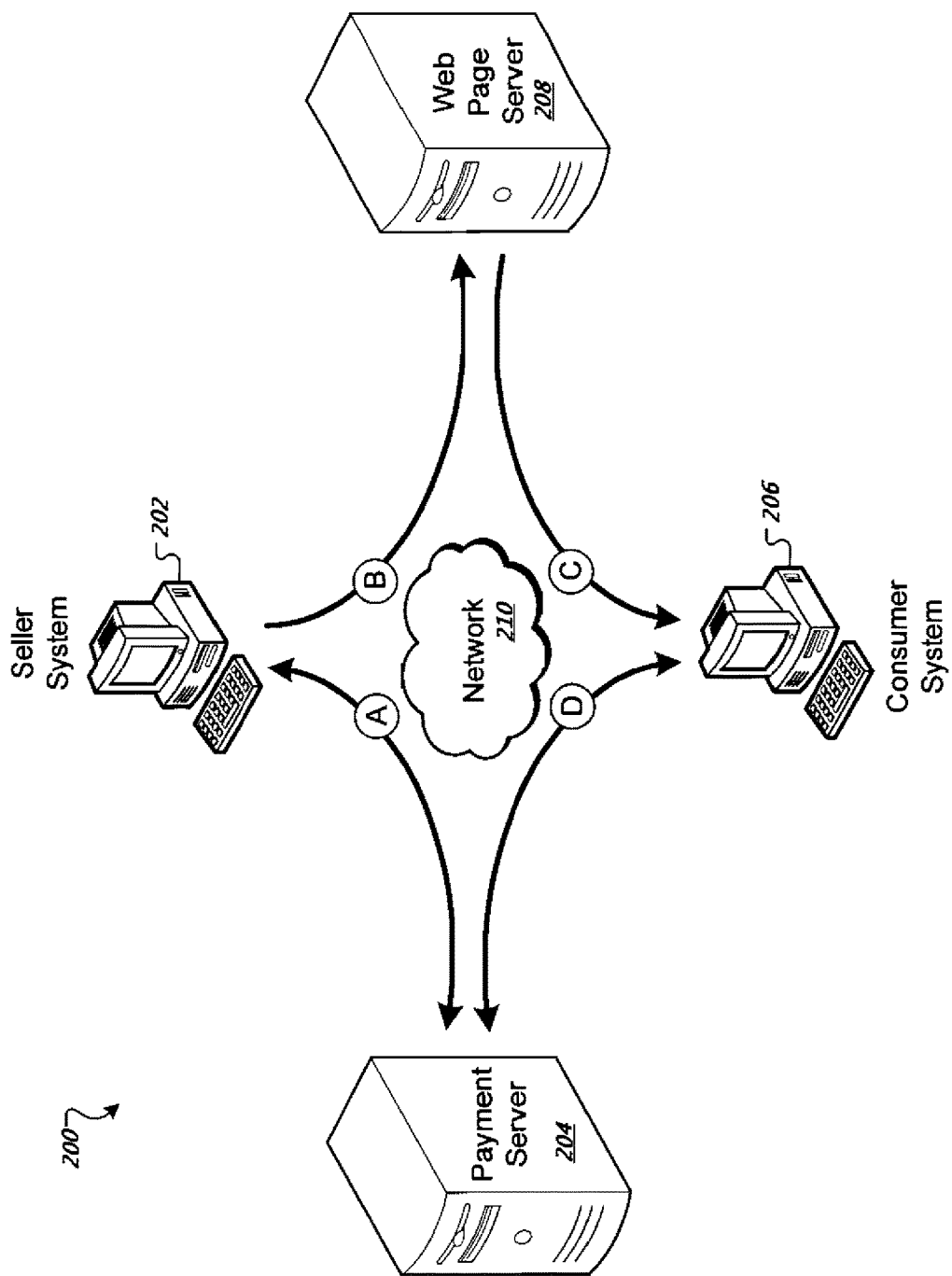
FIG. 2 is a conceptual flow diagram of a payment processing system.

FIG. 2 is a conceptual flow diagram of a payment processing system 200. The system 200 can be used, for example, to implement the process shown in FIGS. 1 to 1E. In general, the system 200 includes various computers 202-208 (which may each be a single computer or a group of many computers such as an entire server farm or data center) that can communicate through a network such as the internet 210. The computers include a seller system 202, such as that operated by a vendor who sets up and operates an on-line ecommerce web site.

The seller system 202 may create a web page and, as shown by Arrow A, register the seller with a payment server 204 such as payment server 114. The seller may identify himself or herself, and may open an account into which payments from buyers may be placed. In addition, the seller may optionally also open and populate an inventory database for goods to be offered for sale by the seller. The seller in particular may identify names and descriptions for items to be sold (which may include goods or services), along with prices for the items.

As part of the registration process or at a later time, the payment server 204 may generate and provide mark-up code to the seller (Arrow A) so that the seller can cut-and-paste the code into the seller's web page. The mark-up code may include HTML, XHTML code, or other forms of code for producing the display of a purchasing control, such as an "add to cart" button that causes payment server 204 to record that a visitor to the web site wants to add a particular item associated with the control to his or her cart.

As shown by Arrow B, the seller system 202 may then upload the completed web page to a web page server 208, which may be, for example, a server or servers at an internet service provider (ISP) with which the seller has a relationship, or may also be a server or servers owned and operated by the seller.

At a later time, a user of a consumer system 206 may navigate to the seller's web page, such as by entering a search term for "hand-made jewelry" (which would be routed through a search server, not shown), and selecting a link for the relevant site from the provided search results. The user may navigate through the jewelry site and be provided with various web pages for the site, as shown by Arrow C.

At some point during this browsing process, the user sees something he or she likes, and clicks on a control to add the item to his or her shopping cart. The control may be, for example, one of the controls generated by code provided by the payment server 204 via Arrow A. Selection of the control may direct the user's browser to obtain information from payment server 204 relating to a shopping cart to be associated with the consumer system 204. For example, as shown by Arrow D, the user may transmit information identifying their system and the control, and the payment server 204 may use the information to determine the identity of the vendor, the item selected, and the amount of the item, so as to update a shopping cart for the consumer system 206. Alternatively, the information sent by the consumer system 206 may include information identifying the vendor and the item and price, or the payment server 204 may acquire such information from he web page server 208 or another source using identifying information submitted from the consumer system 206.

Once the payment server 204 has updated a shopping cart for the consumer system 206 in its own records, it may pass information reflecting the updated shopping cart back to the consumer system 206 (e.g., number of items in the cart and total dollar value of items in the cart), such as via XML messaging, so that the consumer system 206 can display the cart to the user. The transmission of the information may occur in a manner other than generating an entirely new web page for the consumer system 206, so that the user need not have a new and separate browser window opened or have their browser redirected to a site associated with the payment server 204. The display of the new information may occur in the same window or tab as the web page, such as by using an iframe or other similar structure. In general, the interaction with the payment server 204 may occur in the background, unnoticed by the user.

Further interaction between consumer system 206 and payment server 204 may occur in a similar manner or via redirection of an entire browser pane to the payment server 204. For example, the user may continue to browse the vendor web page for additional items (as indicated by Arrow C) and may have those items added to a shopping cart in a similar manner. In addition, the user may browse to other vendor web sites and may add items from those sites to their cart in a similar manner (e.g., by selecting controls that those other vendors have obtained from payment server 204, and that allow payment server 204 to identify the particular items to be sold and the vendors of the items). Additional activity may occur via redirection, such as if the user chooses to checkout and purchase all the items in their cart, as described above, and such action will involve additional transmissions as indicated by Arrow D.

Figure 3:
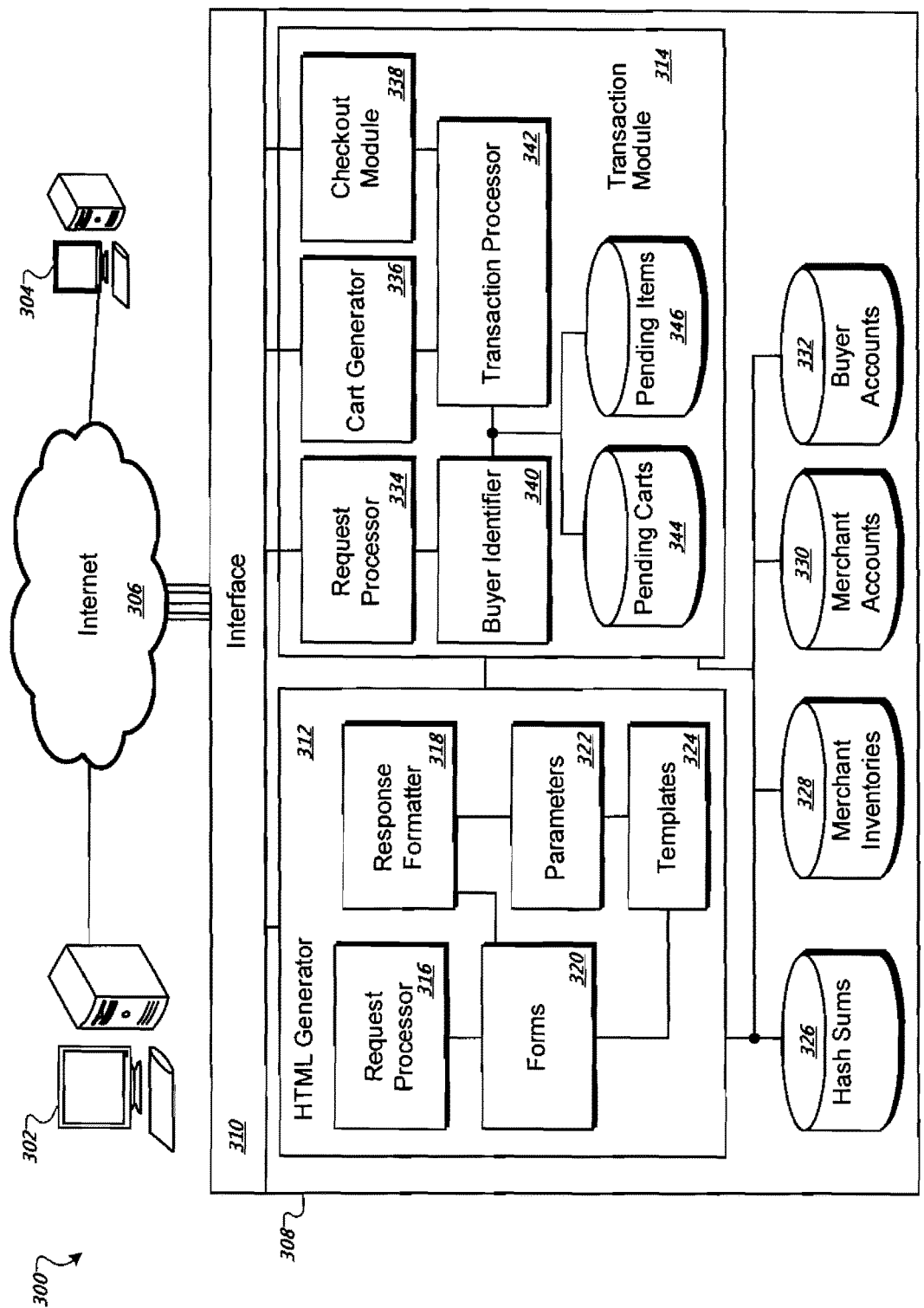
FIG. 3 shows block diagram of an example payment processing system.

FIG. 3 shows a block diagram of an example payment processing system 308. In general, the system 308 contains components to interact with developers of web pages and visitors to those web pages in a larger e-commerce system 300 so as to permit the inclusion of shopping controls on the web pages and selection of those controls to update shopping cart information for the web sites. Other information in addition to shopping cart information may also be provided in a like manner.

The payment processing system 308 is shown in the example to communicate with a client 304, which may represent a consumer browsing the web to purchase items, and a server 302, which may represent a web server providing access to one or more web sites that are offering goods or services for sale. The server 302 and client 304 communicate with each other and with the payment processing system 308 via a network such as the internet 306.

The payment processing system 308 communicates with the outside world using an interface 310, which may take the form of one or more web servers and other such hardware, or may take other appropriate forms. For illustration, two main components are shown in payment processing system 308—an HTML generator 312 and a transaction module 314. The HTML generator, in this example, is configured to receive parameters regarding items to be sold by vendors and to generate code, such as HTML or XHTML, for the vendors to include in their web pages, to generate controls for making ordering and selection of the items easier for visitors to the sites. The transaction module 314 receives requests from users who are seeking to buy items, such as by the users' selection of controls generated by the HTML generator 312, updates databases with information to reflect such transactions, and provides information back to vendor sites to permit information about the transactions and other transactions to be reflected at the vendor sites.

The HTML generator 312 includes a number of structures for receiving from web developers parameters for web shopping controls and for generating HTML or other code that will produce such controls for the web developer. Request processor 316 receives communications from web developers through interface 310, and makes determinations about the actions to be taken on the requests. For example, request processor may receive an HTTP request to obtain mark-up language code for a web page, and may access forms module 320 to serve a form to the requester. The form may include areas in which the requester can provide information about an item the requester hopes to offer for sale, such as a description and price for the item. The requester may enter such parameters into the delivered form, and may submit the parameters back to payment processing system 308.

HTML generator 312 may then store the parameters in parameters module 322, and may access generic HTML code from templates module 324. By combining the template information with the supplied parameters in a conventional manner, the HTML generator 312 may produce mark-up code for the user that the user can employ to provide payment processing services on their web site. Such information may be formatted and provided to the user via response formatter 318. Response formatter 318 may deliver information in various manner, including by HTML displayed on a wen page shown to the requester in which a box is filled with the code (see FIG. 4), so that the requester can cut-and-paste the code into their web page.

With the code generated, HTML generator 312 may also perform a hash function on the provided code to generate hash sums for later comparison with submission by visitors to the web page. Specifically, the code itself may be hashed to generate a hash sum (e.g., an integrity check value, or ICV), and later submissions from the page may be compared to the hash sums to verify that the integrity of the code has not been compromised. Hash sums may be stored for various controls in a hash sums database 326, which may be accessed later as described below. Any appropriate hash algorithm may be used in generating hash sums for the system 300.

With the vendor web page complete and posted, prospective purchasers may visit the page and decide to click on a control, such as an "add to cart" control, added by the HTML generator 312. Such selections will cause a message such as an HTTP request to be provided to request processor 334 in transaction module 314. The message may include an identifier for the user's device, and by extension, an identifier for the user, and may also include one or more other identifiers that permit identification of an item to add to a cart associated with the user, and an identity of the vendor. Buyer/merchant resolver 340 may use identifiers in the received information to determine the buyer and the merchant for a transaction, such as by performing look-ups in merchant accounts database 330 and buyer accounts database 332. The databases 330, 332 may store various information about buyers and merchants, such as address and other contact information, accounts information, and other conventional information needed to carry out transactions with such parties. The buyer/merchant resolver 340 may then identify and store a buyer/merchant pair that uniquely identifies the particular transaction being built by the buyer. Subsequent transactions, such as adding additional merchandise to a shopping cart, may also be addressed to records identified by this buyer/merchant pair.

With the buyer/merchant pair resolved, transaction processor 342 may open a new shopping cart for the pair, and may populate the cart with information associated with the selected control. A pending shopping cart table (stored, e.g., in pending carts database 344) that tracks the transaction may include fields for a ConsumerID, a MerchantID, an AnonymousID, and a CartID, where each field represents an identifier, respectively, for the user purchasing items (e.g., an overall identifier for the user in a system such as the Google system), the vendor that created the web page, a user who has not yet been identified, and unique cart. Generally, an entry would either have a UserID or an AnonymousID.

A pending item table may also be stored (e.g., in pending items database 346), and may have a child-parent relationship with the pending shopping cart table. The pending item table may include fields for a textual item name, a textual item description, private item data for a merchant that is not available to buyers, and a quantity (e.g., a quoted price applies to a pair of shows rather than a single shoe).

A cart generator 336 is a structure that that receives parameters relating to a proposed purchase and formats them for transmission to a web page of a purchaser. The cart generator 336 may, for example, receive item quantities and dollar values from transaction processor 342, and may format them into an XML message or other form for transmission to a purchaser's browser.

Checkout module 338 may be accessed when a purchaser decides to finish a transaction and buy or edit items in his or her shopping cart. Checkout module 338 may differ, in certain implementations, from cart generator 336, in that it may generate full HTML code for display by a purchaser's browser, so that the purchaser receives the impression of being taken to another, different web page or web site than the page on which they were previously shopping. Alternatively, checkout module 338 may also provide information in a form similar to that for cart generator 336, such as through XML messages, so that the checkout process occurs in a more seamless fashion. The checkout module may manage closing out of a transaction, such as by computing a total cost, any transaction fees, taxes, and shipping/handling, in a conventional manner.

Figure 4:
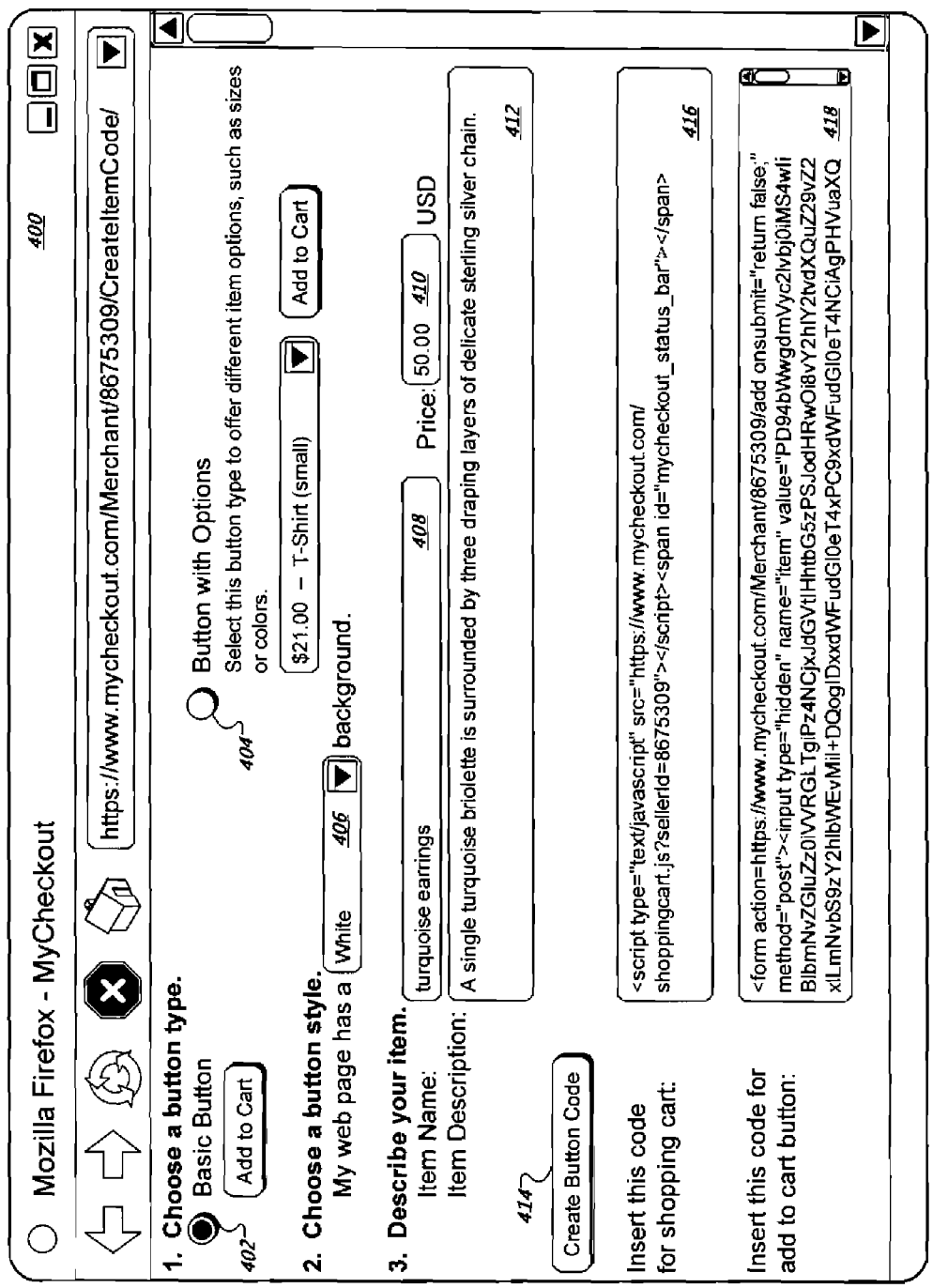
FIG. 4 shows an example screen shot for obtaining web code but a purchasing button.

FIG. 4 shows an example screen shot for obtaining web code for a purchasing button. In the screen shot, a display 400 showing a browser interface presents a user with an easy, step-by-step process for entering relevant information and obtaining the code. Radio buttons 402, 404 permit the user to initially choose the sort of button they would like added to their page. The first radio button 402 adds a basic button to the page, which when selected adds a single item of a product to a purchaser's shopping cart. The second radio button 404 provides a more complex purchasing button, by which a visitor to the web page may make a selection of a particular parameter, such as a size of a t-shirt and the like. Example buttons are also shown for each selection, for the benefit of a user.

Control 406 permits the user to identify a button style, such as a color for the button so that it matches the color of their web page. Other similar such options may also be provided to the user. Also, although shown in numbered order, the various options on display 400 may be entered in any appropriate order unless indicated otherwise (e.g., code for a button will not be generated until the button is adequately defined).

Various text entry areas 408-412 permit the user to enter parameters for the product to be sold using the generated button. Text entry box 408 receives entry of a product name, while text entry box 410 receives a product price, and text entry box 412 receives a product description. Such entries may be coded along with the button, so as to be displayed on the vendor's web page with the button, and may also be stored by a payment processing system for use in processing transactions or as checks on information submitted when a purchaser selects the button.

A create button code button 414 causes an HTTP request to be sent to a remote server, with the information provided in the display 400 being sent with the request. The remote server may then use the submitted information to generate code for managing a shopping cart, along with code for generating an add to cart button. The code for managing a shopping cart, displayed in area 416, may include Javascript code or a pointer to Javascript code stored at a remote server. The Javascript code (or other forms of code) may be configured to generate an iframe on a web page and to populate it as shown in the figures discussed above. The iframe may be locked in a location on the web page, or may float over the web page (e.g., so that it stays "in frame" as the page is scrolled up or down). In addition, the iframe may be configured to expand when a product is selected and to contract or disappear when a user is browsing for products. The code for generating an add to cart button, displayed in area 418, may take the form of HTML code as shown in more detail above. The code in both areas 416 and 418 may be highlighted by a user, so that it can be cut-and-pasted into the user's web page. Other features may also be provided to the user, include "help" selections to provide more detailed explanations of each of the features in display 400.

Figure 5A:
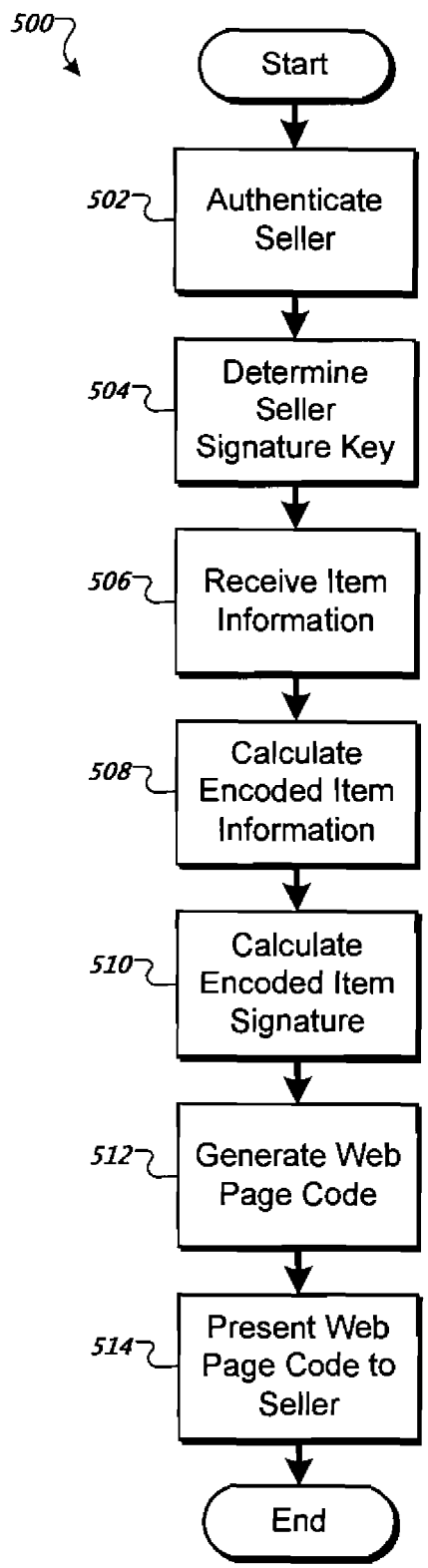
FIG. 5A is a flow chart of a process for providing a vendor with purchasing code.

FIG. 5A is a flow chart of a process 500 for providing a vendor with purchasing code. In general, the process 500 involves providing custom code to a web site developer, based on parameters provided by the developer, that the developer may then add to their website. The process begins by authentication of the seller (box 502). For example, the seller may log in to a payment processing system if they are already registered with the system, or they may provide registration information (e.g., name, address, e-mail, account numbers, etc.) if they are not yet registered. Registration and authentication may permit the payment processing system to associate operations performed by the seller with the seller's account, and also to provide security so that people other than the seller cannot modify the seller's records.

At box 504, the process determines a signature key for the seller. This key may be used when preparing information for the seller's web page, so that submissions from that web page may authenticated later. Such a step may help prevent fraudsters from altering content on the web page to their financial advantage. The payment processing system may then receive item information from the seller (box 506). Such information may include titles of items (e.g., "home made lefse"), item descriptions (e.g., "a scrumptious Scandinavian potato concoction like your Scandinavian grandmother made in Oslo"), and a price (e.g., "$3 per package—10 sheets per package"). Other information about items for sale may also be provided. The item information may be entered by a seller on one of a variety of forms made available by the payment processing system. A single form could provide a range of options, or various forms may be presented to the seller for selection, and the seller may than fill out a form that they choose. For example, purchases of individual items (e.g., clothing and the like) may differ sufficiently from purchases of bulk items (e.g., foodstuffs) that a single form cannot adequately address both situations. In such a situation, a form may be prepared for both situations, and the user may select the form that best applies, may enter parameters into that form, and may then submit the fill-out form to the payment processing system.

At box 508, encoded item information is calculated, and at box 510, an item signature is created. Such actions may result in a code such as a hash code being created for the submitted parameters, so that the hash code can be checked later when shoppers submitting information from the seller's web site try to make purchases. The payment processing system generates web page code at box 512, such as by merging the parameter values submitted by the seller with pre-existing code templates. Other conventional methods for code generation may also be used. The generation of a signature may also follow generation of the web page code, and the signature may be based in whole or in part on the content of the generated web page code.

At box 514, the web page code is presented to the seller. Such presentment may occur as shown in FIG. 4, by displaying the code and permitting the seller to cut-and-paste the code into their web page. The presentment may also occur automatically, such as by pushing the code to particular spots in an open mark-up language document on the seller's client device, e.g., at particular pre-determined tags inserted in the page. The code may also be stored remotely of the client device, and pointers to the code may be placed in the seller's web page. In addition, the code incorporated into the web page may itself point to other code, such as Javascript code.

Figure 5B:
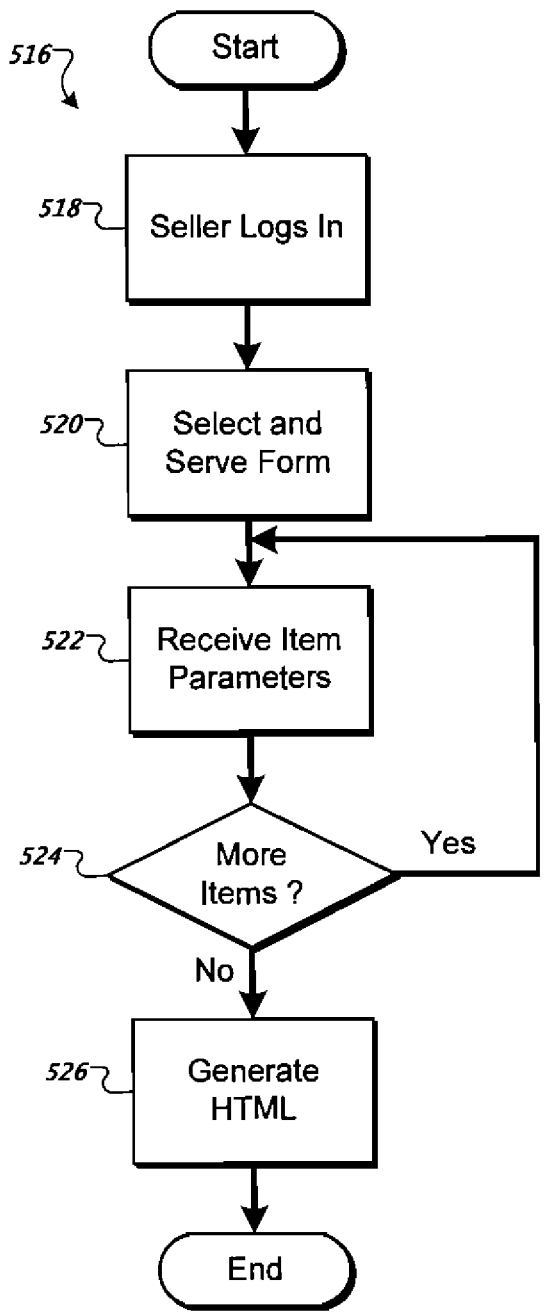
FIG. 5B is a flow chart of a process for providing a vendor with purchasing code.

FIG. 5B is a flow chart of a process for providing a vendor with purchasing code. This figure is similar to FIG. 5A, but provides less detail, and also describes a situation in which a seller seeks to populate a web page with mark-up code for multiple items. At box 518, the seller logs in by conventional techniques, an at box 520 the seller selects a form for entering item information. The seller then enters various parameters (e.g., title, price, and description) for an item.

The seller may then determine whether they would like to enter information for more items. For example, the seller may be presented with buttons whereby the seller may choose to be presented with a blank form so as to enter another item, or may continue on to have mark-up code generated for all the items they have entered so far. As shown by box 524, this process may happen multiple times until the seller has entered all desired items. Alternatively, such recursive entry of items may occur on a single screen, such as through a spreadsheet having a column for each item parameter, and rows for each individual item entered by the user. In such an implementation, the seller can keep entering information until they are done. The entry process may also be partially or fully automated. For example, a seller database may be accessed by a payment processing system so as to import particular information for a number of items, or an existing web page may be accessed to have item parameters extracted from it, and the existing code replaced by mark-up code that points to the payment processing system rather than to a prior target. Such automated processing may be particularly beneficial for sellers who list a large number of items, or for sellers who have previously coded a web page for another payment process and want to switch to the various implementations described in this document.

At box 526, HTML code or other such code (e.g., Javascript) is generated for the seller. The code may be presented to the seller in the manners discussed above, and may be incorporated by the seller into the seller's web page. In addition, various security techniques may be employed as described above to ensure that the code is not improperly tampered with.

Figure 6A:
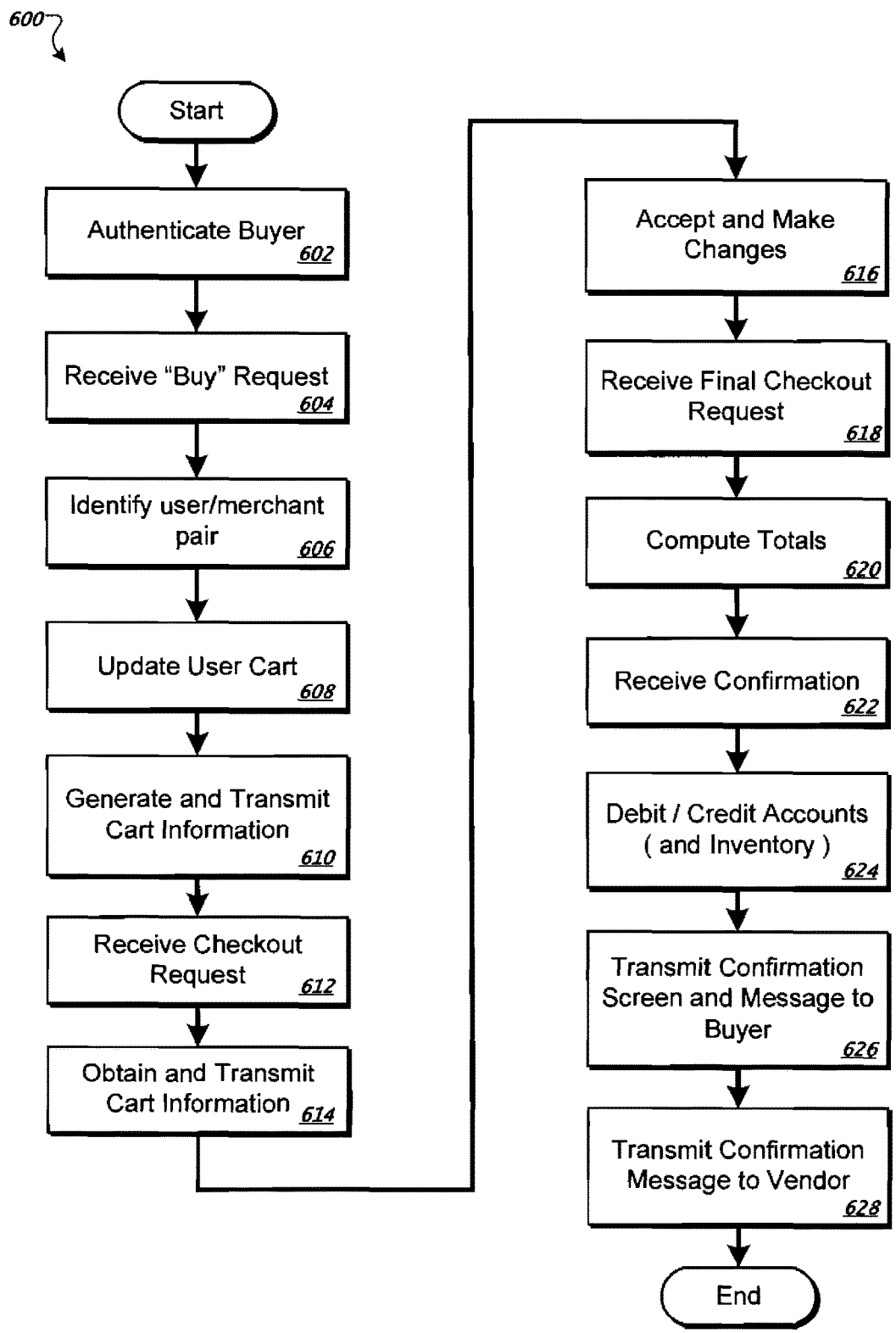
FIG. 6A is a flow chart showing the processing of an on-line payment transaction.

FIG. 6A is a flow chart showing the processing of an on-line payment transaction. In general, the flow chart represents a process 600 in which a shopper visits a seller's web site and selects certain items for purchase, and then choose to complete the purchase. The particular example is provided for illustration in the context of a shopping cart metaphor, though, as with the other examples, discussed herein, is not limited to use of so-called shopping carts or shopping baskets, but may include other mechanisms for representing purchase transactions to shoppers.

The shopper, or buyer, first authenticates themselves to a payment processing system (box 602). Such authentication allows the system to associate subsequent purchase requests with the user's account, such as to remove money from the user's account or submit a charge to a credit card associated with the user. The authentication can also occur later in the process. In such a situation, the payment processing system can track the user via a session ID, and can later hook up the session ID with the user's account when the user ultimately authenticates themselves through a log in.

After the buyer (who is not yet a true buyer at this point) has surfed various web sites, they may select an "add to cart" or similar control on a site that is established to receive payment through the particular payment processing system. The selection of the control may cause an HTTP request to be sent to the payment processing system, and the system may use the request to identify the buyer and the seller (box 606), either or both of which may permit the system to identify the item being selected and various parameters for that item. (Alternatively, an identifier for the item may permit identification of the seller.) Upon identifying the buyer and the item parameters, the system may then create or update a shopping cart for the buyer (box 608) and may generate and transmit information reflecting the updated cart back to the buyer's client device (such as to a web browser running on the buyer's computer).

After a time, the payment processing system may receive other similar requests to add items to the cart, and may ultimately receive a request to check out, i.e., charge the buyer for the items in the cart, or to edit the cart (box 612).

Upon receiving such a request, the payment processing system may obtain the current cart information form its records and transmit that information to the buyer, such as by generating a checkout web page or by sending cart information to the buyer's browsers from display in an iframe or other similar structure (box 614). The buyer may make changes to the cart, such as by removing duplicate purchases or removing purchases if the total cost of the cart is too high (box 616). The payment processing system may also request other information from the buyer, such as preferred shipping methods and the like. Once the order is in a form agreeable to the buyer, they may submit it for final processing to the payment processing system (box 618). The system may then make final computations of the payment totals (box 620), present them to the buyer for final confirmation, and receive such confirmation (box 622).

After obtaining final confirmation, the system debits and credits the appropriate accounts. For example, the system may make a charge to a credit card of the buyer, or to an bank account or other account associated with the buyer. The system may likewise add a corresponding amount to an account of the seller (though the amount may differ from the amount taken from the buyer, such as to cover various transaction costs). In addition, where an inventory of the seller is available to the payment processing system (e.g., through Google Base), the inventory may be decreased for each of the purchased items (or an indicator to decrease the inventory may be provided so that the inventory is decreased when the item is shipped).

Upon making the relevant changes in its files, the payment processing system may provide confirmation of the transaction to the buyer and the seller—both by conventional mechanisms (boxes 626 and 628). The confirmation for the buyer may occur via additional HTML sent to the buyer's browser indicating that the transaction is complete. A follow-up e-mail may also be sent to the buyer, with contact information so that the buyer can get ahold of the seller to inquire about the progress of the order, e.g., whether it has been shipped. In a like manner, the seller can also be notified, such as by a mechanism previously identified by the seller. For example, a small seller may wish to be notified via e-mail, while a larger seller may wish to receive information via XML messages formatted so that the seller may use the information in their database system (e.g., for automated generation of invoices and shipping labels).

Figure 6B:
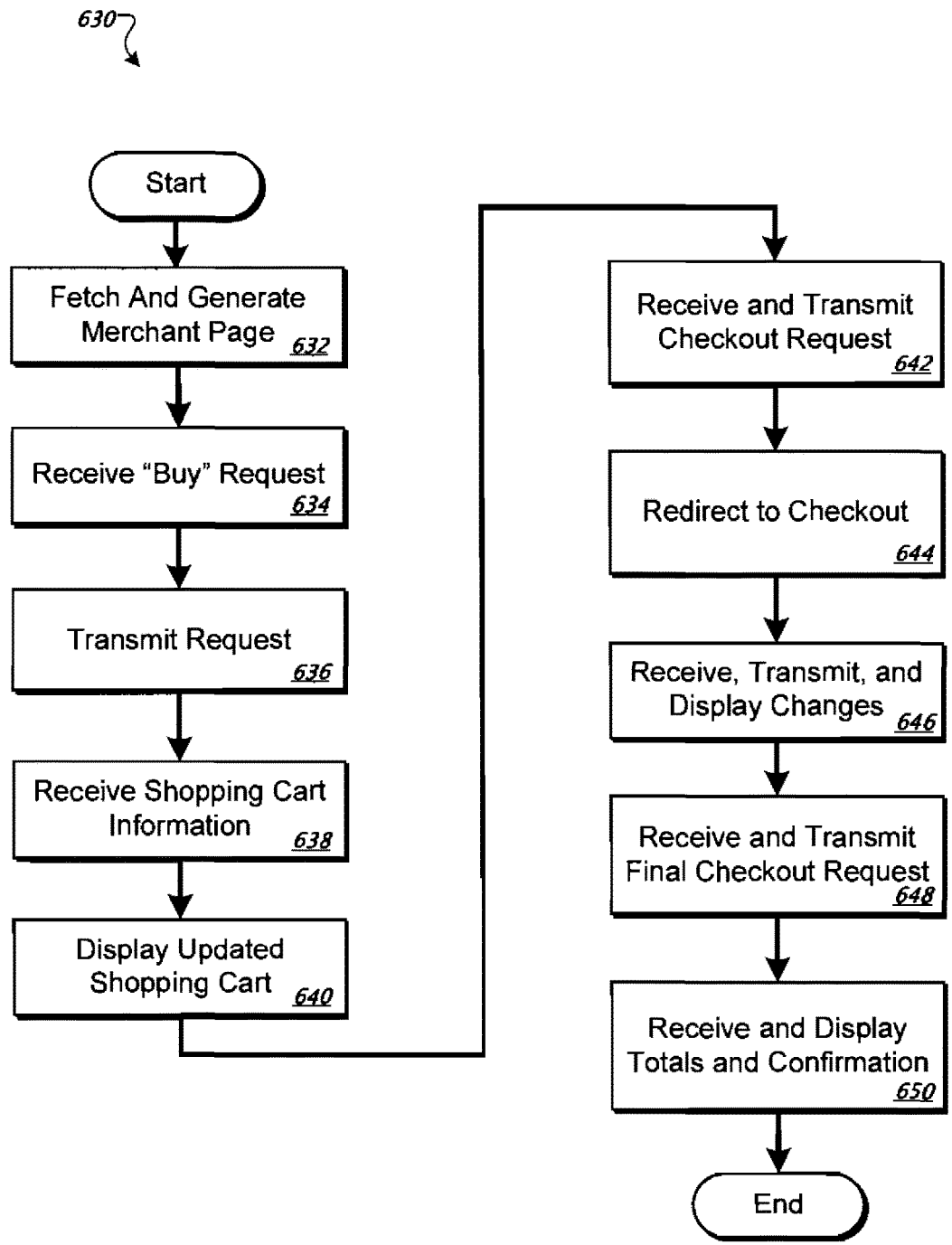
FIG. 6B is a flow chart of a process for buying from an independent vendor.

FIG. 6B is a flow chart of a process 630 for buying from an independent vendor. This process 630 is similar to process 600, but is shown largely from the client side, such as from a browser being operated by a buyer. At box 632, the browser fetches and generates a merchant page, and subsequently (at box 634) receives a "buy" request from the buyer. The request may occur, for example, by the buyer's selection of an on-screen control in the content are of the browser (e.g., a button). The browse may translate the selection into a request to a remote server (e.g., an HTTP request) that include information about an item associated with the control (such as an ID number that permits the remote server to determine what the selected item is, and to determine the seller associated with the item).

The remote server may then respond with shopping cart information that is received at the browser (box 638), showing the addition of the relevant item to a shopping cart for the user, or other appropriate change in the content of, or other parameters relating to, the shopping cart. The browser may then display information about the shopping cart, such as in an element in the same content area of the browser window as the seller's web site is located in (box 640). Such display may occur using a structure such as an iframe.

At some later time, the user may choose to check out and pay for the items in their cart, so that the browser receives such as command and translates it into a request to the remote server to have checkout information provided to the browser (box 642). In one implementation, the selection may cause the browser to be redirected to a checkout web page associated with the remote server (box 644), at which web page the user may make changes to the shopping cart and related information so that the browser receives, transmits, and displays changes to the cart and related information in a conventional manner (box 646). Once the user is satisfied with the order, the browser may receive a command to transmit a final checkout request, and may do so (box 648). The browser may subsequently receive from the remote server final totals for the order along with confirmation that the order has been completed (box 650).

Figure 7:
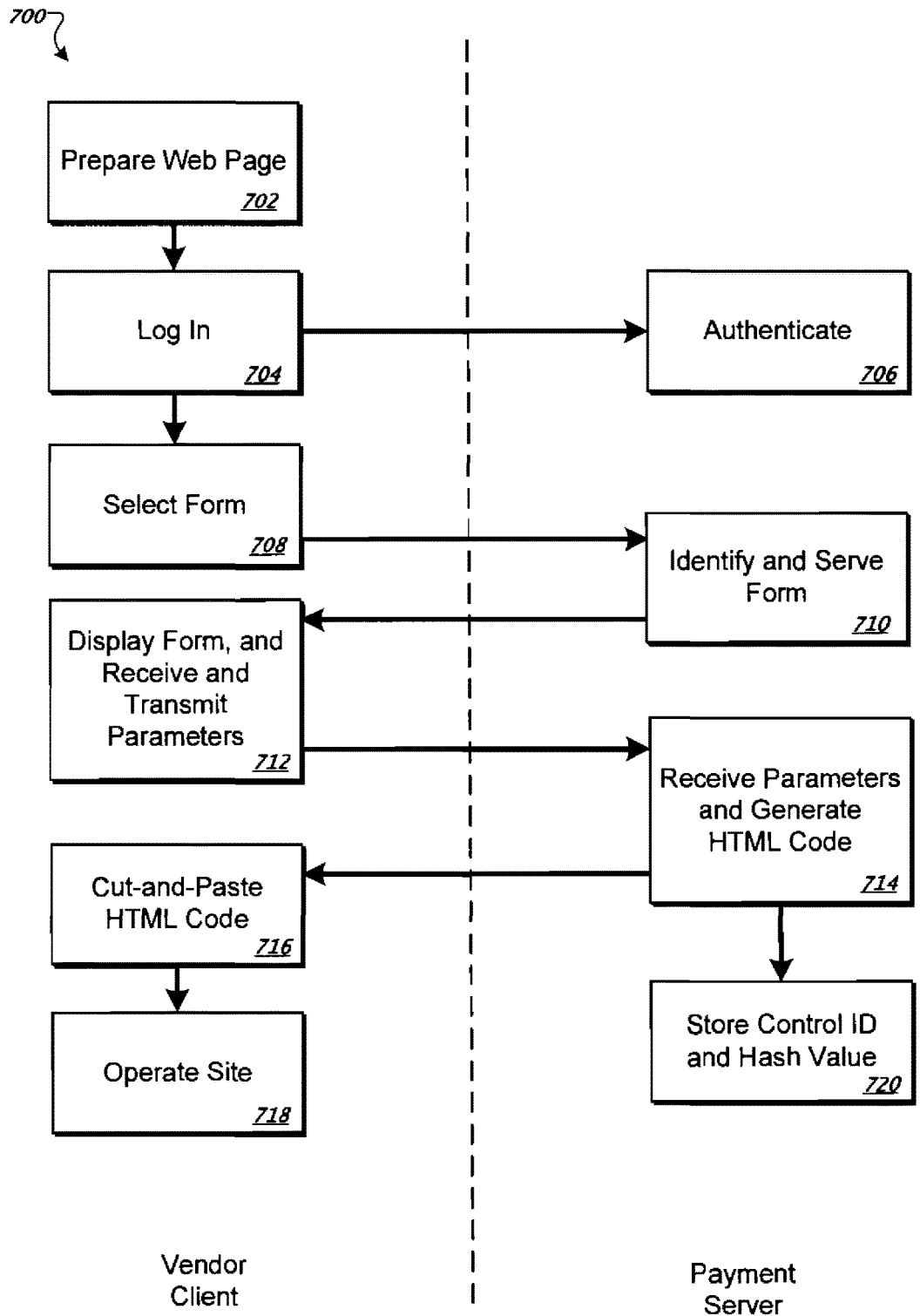
FIG. 7 is a swim lane diagram showing the provision of web page code to an independent vendor.

FIG. 7 is a swim lane diagram 700 showing the provision of web page code to an independent vendor. This diagram 700 is similar to prior descriptions of processes by which web page designers may have a remote server (whether a single server or multiple servers) associated with a payment processing system generate code for a control that permits visitors to their web site to easily select items for purchase, and have those selections recognized by the payment processing system.

At box 702, a vendor prepares a web page showing various wares that they will be making available for purchase. Once the vendor has the page in good shape and is ready to add purchasing controls, the vendor may log in (box 704) to the payment processing system, and the system may authenticate the vendor (box 706). Authentication may also occur later in the process, and the vendor may then be connected to actions they took earlier in the process, in a manner like that described above. The vendor may also be provided with a selection of forms associated with the process 700, and may select one of the forms (box 708). The payment server may then identify the appropriate form and serve it to the vendor (box 710), where the form may be displayed (e.g., by a browser running on the vendor client), filled out with various parameters by the vendor, and transmitted by the vendor's client device to the payment server (box 712).

Upon receiving necessary information for generating controls, the payment server may generate code for such controls using the parameters provided by the vendor, and may provide the code for the use of the vendor (box 714). For example, the code may be provided in an area of a web page from which the vendor may cut-and-paste it into the code of their own web page (box 716). When providing the code, the payment server may also store an ID for each control and calculate a hash value for the control. As explained above, the hash vale may be used later when a shoppers selects a control, to help ensure that the code for the control has not been tampered with. And on the client side, the vendor may begin operating his or her site, and welcoming visits from potential shoppers.

Figure 8A:
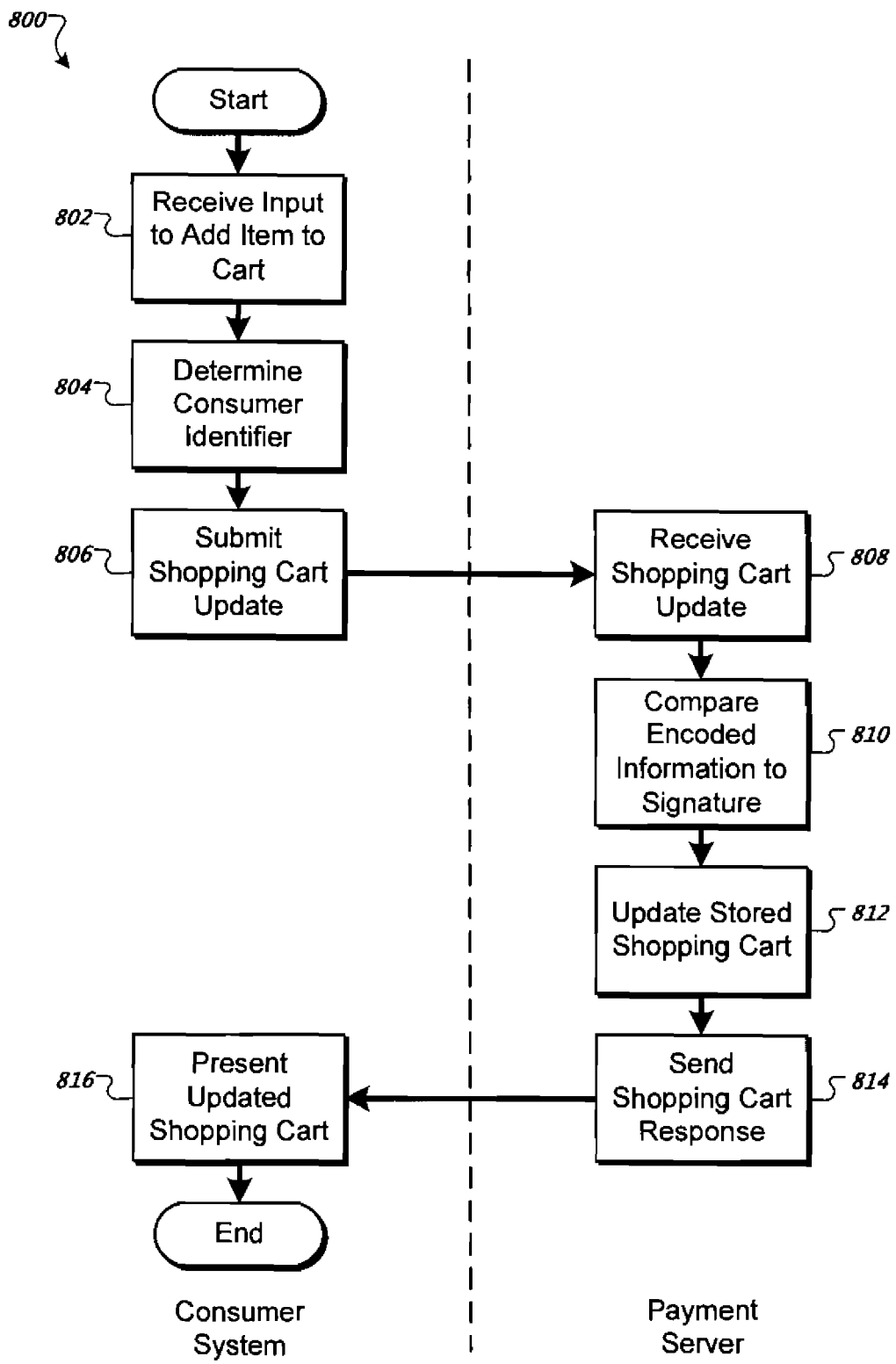
FIG. 8A is a swim lane diagram of a process for processing a purchase from an independent vendor.

FIG. 8A is a swim lane diagram of a process 800 for processing a purchase from an independent vendor. In general, the process 800 is similar to other processes described above illustrating the actions of a shopper or consumer visiting a vendor's web site, such as a site having payment controls generated by the method just discussed. At box 602, a consumer system being operated by a user who is looking to purchase items on-line receives input to add an item from a merchant web page to a cart. The consumer system may determine an identifier for the consumer, such as by reading a value from a cookie stored on the system (box 604), and may submit the located information along with other information generated by selection of the control to a payment server for updating of the consumer's shopping cart (box 606).

When the payment server receives the communication from the consumer system (box 608), it may compare certain of the received information to a signature, such as a hash sum, associated with the provided information, to ensure that the information has not been tampered with (box 610). If the submitted information checks out, the server may then update the consumer's shopping cart (using, e.g., parameters stored by the server and/or parameters provided in the communication form the consumer system) (box 612) and send information reflecting the updated shopping cart back to the consumer system (box 614). The consumer system may then display information for the updated shopping cart, such as by the techniques described above.

Figure 8B:
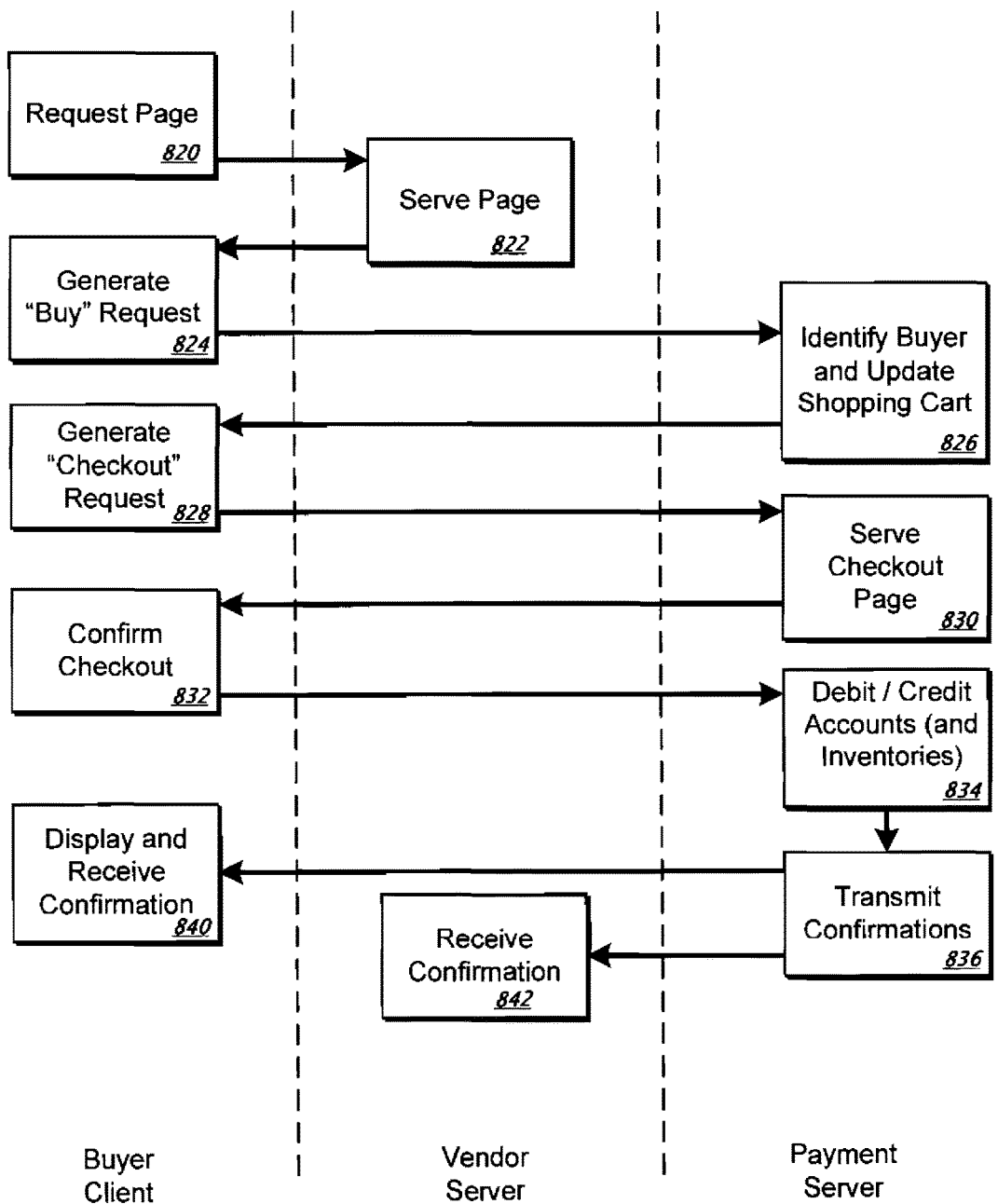
FIG. 8B is a swim lane diagram of a process for processing a purchase from an independent vendor.

FIG. 8B is a swim lane diagram of a process for processing a purchase from an independent vendor. This figure is similar to the process shown in FIG. 8A, but shows a more complete interaction of the three parties involved in a commercial transaction on-line. At box 820, a buyer surfs to a vendor's web page and requests the page, such as by the buyer selecting a hyperlink, from a list of search results, that corresponds to the vendor's page (box 820). The vendor's server may then provide the page top the buyer's client (box 822) in a conventional manner. The provide page may include controls that point to a payment server associated with a general public payment service such as GOOGLE CHECKOUT.

After the buyer has reviewed the page for a sufficient time period, the buyer may select a control for buying an item from the vendor, and the buyer's system (e.g., web browser or similar application) may generate a "buy" request (box 824) that is sent to the payment server. Upon receiving the request, the payment server may identify the buyer and update their shopping cart (box 826) using, for example, information from the "buy" request and other information stored by the payment server. The payment server may also, in certain implementations, submit one or more requests to the vendor server f more complete information (not shown). The payment server may then transmit information for an updated shopping cart to the client, and the user may then cause the client to generate a "checkout" request to the payment server (box 828).

The checkout request may causes the payment server to generate and serve a checkout page (box 830) which will be displayed on the client. The buyer may edit and then confirm the content for checkout (box 832, and the payment server may apply appropriate credits or charges to the buyer and vendor accounts, and may optionally update the vendor's inventory when such inventory records are accessible to the payment server (box 834). Finally, the payment server may transmit confirmations of the transaction to the buyer and the vendor (box 836), as described above, and the buyer (box 840) and vendor (box 842) systems may present those confirmations in an appropriate manner.

Figure 9:
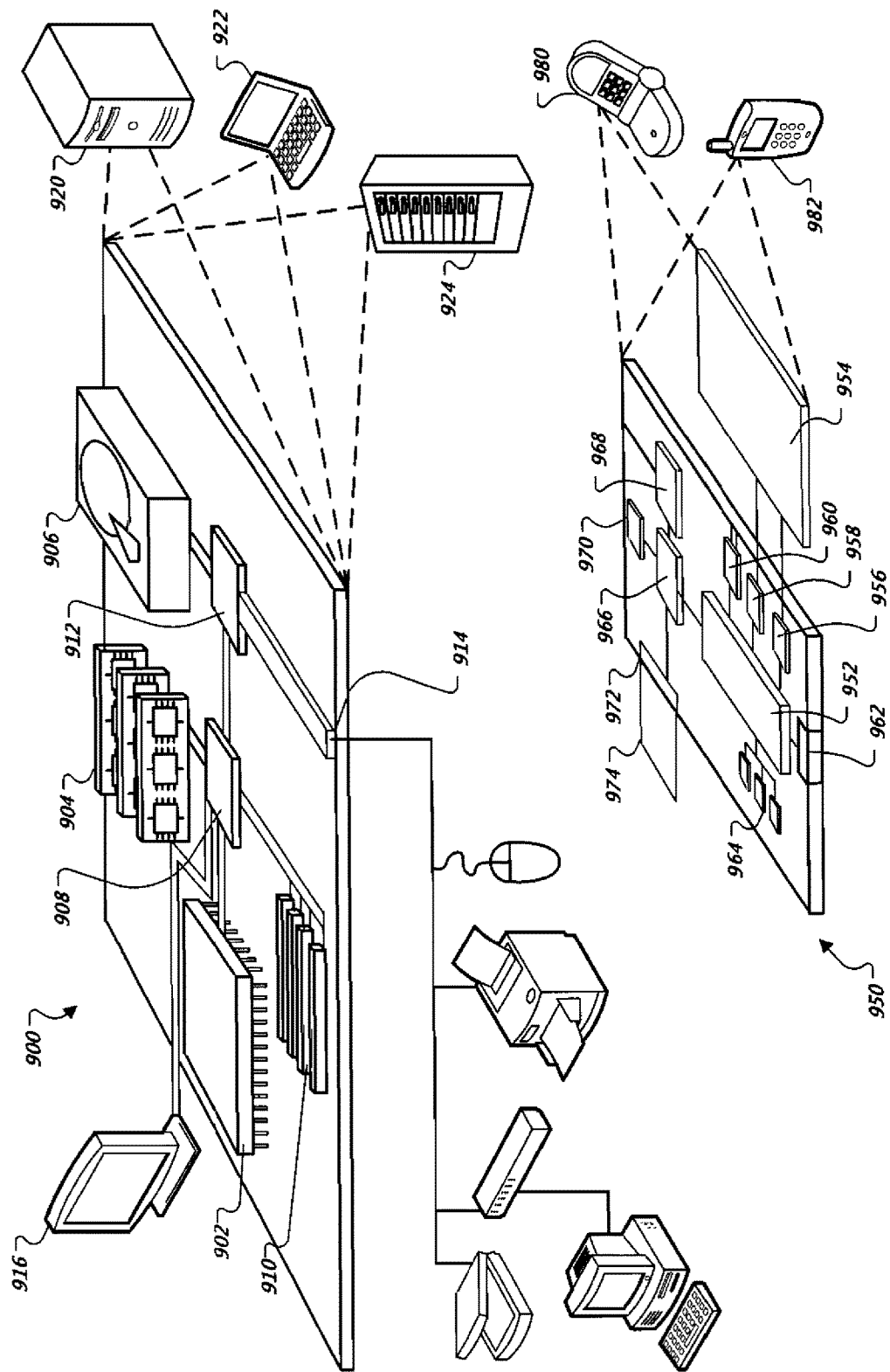
FIG. 9 shows an example of a generic computer device and a generic mobile computer device.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the payment systems and methods have been described, it should be recognized that numerous other applications are contemplated. Moreover, although many of the embodiments have been described in relation to a so-called shopping cart, that term should be understood to include various forms of mechanisms for presenting an organized grouping of items or servers that a user has selected for possible purchase, and can include such descriptions as shopping baskets and the like. Accordingly, other embodiments are within the scope of the following claims.

What is claimed is:

1. A computer-implemented method to dynamically update a display of a merchant web page during an online transaction without refreshing a window viewed by a user when an item is selected for purchase using a payment computing system that manages purchases made from a plurality of merchant web pages, comprising:
   receiving, by a payment computing system that manages purchases made from a plurality of merchant web pages and from a user computing device displaying a merchant web page, a product selection request comprising an indication that a user selected a control on the merchant web page associated with one or more items displayed on the merchant web page in a single window, the merchant web page comprising a visual representation of the one or more items in the single window, wherein the payment computing system is distinct from the merchant web page;
   in response to receiving the product selection request, determining, by the payment computing system, at least an identity of a merchant associated with the merchant web page, an identity of the one or more items associated with the control selected by the user on the merchant web page, and a purchase price of the one or more items associated with the control selected by the user on the merchant web page;
   providing, by the payment computing system and to the user computing device displaying the merchant web page, purchase information associated with the one or more items selected by the user for display in an iframe on the merchant web page in the single window with the visual representation of the one or more items selected by the user without refreshing the single window, wherein providing the purchase information activates asynchronous generation of the iframe and dynamic updating of the display of the merchant web page on the user computing device without refreshing the single window; and
   initiating, by the payment computing system, a check-out process within the iframe on the merchant web page in the single window with the visual representation of the one or more items selected by the user without refreshing the single window.

2. The method of claim 1, wherein the payment computing system supports payments made to a plurality of different merchants.

3. The method of claim 1, wherein the purchase information is provided in response to the product selection request.

4. The method of claim 1, further comprising providing, by the payment computing system, code for inclusion on the merchant web page, the code, when invoked by one or more user computing devices, displays the control.

5. The method of claim 4, further comprising, in response to receiving the product selection request, receiving and checking, by the payment computing system, a hash code generated in response to the product selection request to ensure that the code has not been changed after providing the code for inclusion on the merchant web page.

6. The method of claim 1, wherein providing the purchase information associated with the one or more items comprises checking an inventory database maintained by the merchant for availability of the one or more items prior to providing the purchase information associated with the one or more items.

7. The method of claim 1, wherein the purchase information of the one or more items comprises at least one of a quantity of the one or more items, a price associated with the one or more items, and a total price of the one or more items.

8. The method of claim 1, further comprising:
   determining, by the payment computing system, a purchase price associated with the transaction; and
   causing, by the payment computing system, a credit in the purchase price to be added to an account associated with the merchant.

9. The method of claim 1, further comprising:
   receiving, by the payment computing system, authentication information from the user; and
   matching, by the payment computing system, the authentication information to a session identifier received in the product selection request.

10. The method of claim 1, further comprising:
    storing, by the payment computing system, a range of permissible prices for the one or more items; and
    comparing, by payment computing system, price information for the one or more items received in the product selection request to the stored range of permissible prices,
    wherein the purchase information is provided only if the price information is within the range of permissible prices.

11. A system to dynamically update a display of a merchant web page during an online transaction without refreshing a window viewed by a user when an item is selected for purchase using a payment computing system that manages purchases made from a plurality of merchant web pages, comprising:
a user computing device, comprising:
a user computing device storage device; and
a user computing device processor communicatively coupled to the user computing device storage device, wherein the user computing device processor executes application code instructions stored in the user computing device storage device to cause the user computing device to:
display a merchant web page comprising one or more items in a single window with a visual representation of the one or more items; and
a payment computing system that manages purchases made from a plurality of merchant web pages, comprising:
a payment computing system storage device; and
a payment computing system processor communicatively coupled to the payment computing system storage device, wherein the payment computing system processor executes application code instructions stored in the payment computing system storage device to cause the payment computing system to:
receive, from the user computing device displaying the merchant web page, a product selection request comprising an indication that a user selected a control on the merchant web page associated with one or more items displayed in the single window on the merchant web page;
determine at least an identity of a merchant associated with the merchant web page, an identity of the one or more items associated with the control selected by the user on the merchant web page, and a purchase price of the one or more items associated with the control selected by the user on the merchant web page;
provide, to the user computing device displaying the merchant web page, purchase information associated with the one or more items selected by the user for display in a graphical element on the merchant web page in the single window with the visual representation of the one or more items selected by the user without refreshing the single window;
the user computing device asynchronously generating the graphical element and dynamically updating the display of the merchant web page in the single window to display the purchase information associated with the one or more items selected by the user with the visual representation of the one or more items selected by the user without refreshing the single window; and
initiate a check-out process within the iframe on the merchant web page in the single window with the visual representation of the one or more items selected by the user without refreshing the single window.

12. The system of claim 11, wherein the purchase information is provided in response to the product selection request.

13. The system of claim 11, wherein the payment computing system processor is further configured to execute computer-executable instructions stored in the payment computing system storage device to cause the payment computing system to provide code for inclusion on the merchant web page, the code, when invoked by one or more user computing devices operated by the user, displays the control to transmit a product selection request by the user to the payment computing system.

14. The system of claim 13, wherein the payment computing system processor is further configured to execute computer-executable instructions stored in the payment computing system storage device to cause the payment computing system to, in response to receiving the product selection request, operations of receiving and checking a hash code generated in response to the product selection request to ensure that the code has not been changed after providing the code for inclusion on the merchant web page.

15. The system of claim 11, wherein providing the purchase information associated with the one or more items comprises checking an inventory database maintained by the merchant for availability of the one or more items prior to providing the purchase information associated with the one or more items.

16. The system of claim 11, wherein the purchase information of the one or more items comprises at least one of a quantity of the one or more items, a price associated with the one or more items, and a total price of the one or more items.

17. A computer program product, comprising:
a non-transitory computer-readable medium having computer-readable program instructions embodied thereon that when executed by a computer cause the computer to dynamically update a display of a merchant web page during an online transaction without refreshing a window viewed by a user when an item is selected for purchase, the computer-readable program instructions comprising:
computer-readable program instructions to receive, from a user computing device displaying a merchant web page, a product selection request comprising an indication that a user selected a control on the merchant web page associated with one or more selected items displayed on the merchant web page in a single window, the merchant web page comprising a visual representation of the one or more items in the single window;
computer-readable program instructions to determine at least an identity of a merchant associated with the merchant web page, an identity of the one or more selected items associated with the control selected by the user on the merchant web page, and a purchase price of the one or more selected items;
computer-readable program instructions to provide, to the user computing device displaying the merchant web page, purchase information associated with the one or more selected items for display in a graphical element on the merchant web page in the single window with the visual representation of the one or more selected items without refreshing the single window, wherein providing the purchase information activates asynchronous generation of the graphical element and dynamic updating of the display of the merchant web page on the user computing device without refreshing the single window; and initiate a check-out process within the frame on the merchant web page in the single window with the visual representation of the one or more items selected by the user without refreshing the single window.

18. The computer program product of claim 17, wherein the purchase information is provided in response to the product selection request.

19. The computer program product of claim 17, wherein providing the purchase information associated with the one or more selected items comprises computer-readable program instructions to check an inventory database maintained by the merchant for availability of the one or more items prior to providing the purchase information associated with the one or more items.

20. The computer program product of claim 17, wherein the purchase information of the one or more selected items comprises at least one of a quantity of the one or more items, a price associated with the one or more items, and a total price of the one or more items.

\* \* \* \* \*